United States Patent
Chowdhary et al.

(10) Patent No.: US 11,467,180 B2
(45) Date of Patent: **\*Oct. 11, 2022**

(54) CONTEXT AWARENESS OF A SMART DEVICE THROUGH SENSING TRANSIENT AND CONTINUOUS EVENTS

(71) Applicants: STMICROELECTRONICS, INC., Coppell, TX (US); STMICROELECTRONICS INTERNATIONAL N.V., Schiphol (NL)

(72) Inventors: Mahesh Chowdhary, San Jose, CA (US); Arun Kumar, New Delhi (IN); Ghanapriya Singh, New Delhi (IN); Rajendar Bahl, Gurugram (IN)

(73) Assignees: STMICROELECTRONICS, INC., Coppell, TX (US); STMICROELECTRONICS INTERNATIONAL N.V., Schiphol (NL)

(*) Notice: Subject to any disclaimer, the term of this patent is extended or adjusted under 35 U.S.C. 154(b) by 0 days.

This patent is subject to a terminal disclaimer.

(21) Appl. No.: 17/207,294

(22) Filed: Mar. 19, 2021

(65) Prior Publication Data

US 2021/0208179 A1 Jul. 8, 2021

Related U.S. Application Data

(63) Continuation of application No. 16/257,694, filed on Jan. 25, 2019, now Pat. No. 10,976,337.

(Continued)

(51) Int. Cl.
*G06F 1/16* (2006.01)
*H04W 4/029* (2018.01)
(Continued)

(52) U.S. Cl.
CPC ............ *G01P 15/005* (2013.01); *G01P 15/18* (2013.01); *G06F 1/163* (2013.01); *G06F 1/1694* (2013.01);
(Continued)

(58) Field of Classification Search
CPC ........ G01P 15/005; G01P 15/18; G06F 1/163; G06F 1/1694; G06F 3/017; G06F 3/0346;
(Continued)

(56) References Cited

U.S. PATENT DOCUMENTS 6,525,658 B2   2/2003   Streetman et al.
8,320,932 B2   11/2012  Pinder et al.
(Continued)

*Primary Examiner* — Quan Zhen Wang
*Assistant Examiner* — Mancil Littlejohn, Jr.
(74) *Attorney, Agent, or Firm* — Seed IP Law Group LLP

(57) ABSTRACT

A distributed computing system for artificial intelligence in autonomously appreciating a circumstance context of a smart device. Raw context data is detected by sensors associated with the smart device. The raw context data is pre-processed by the smart device and then provided to a cloud based server for further processing. At the cloud based server, various sets of feature data are obtained from the pre-processed context data. The various sets of feature data are compared with corresponding classification parameters to determine a classification of a continuous event and/or a classification of transient event, if any, which occur in the context. The determined classification of the continuous event and the transient event will be used to autonomously configure the smart device or another related smart device to fit the context.

20 Claims, 14 Drawing Sheets

Related U.S. Application Data

(60) Provisional application No. 62/621,740, filed on Jan. 25, 2018.

(51) Int. Cl.

| | |
|---|---|
| *G06N 20/10* | (2019.01) |
| *G10L 21/10* | (2013.01) |
| *G06K 9/62* | (2022.01) |
| *G01P 15/00* | (2006.01) |
| *G01P 15/18* | (2013.01) |
| *H04W 4/50* | (2018.01) |
| *G06F 3/0346* | (2013.01) |
| *G10L 25/51* | (2013.01) |
| *G06F 3/01* | (2006.01) |
| *H04M 1/72454* | (2021.01) |
| *G10L 25/78* | (2013.01) |
| *H04W 4/38* | (2018.01) |
| *H04L 67/12* | (2022.01) |

(52) U.S. Cl.
CPC ............ *G06F 3/017* (2013.01); *G06F 3/0346* (2013.01); *G06K 9/6268* (2013.01); *G06N 20/10* (2019.01); *G10L 21/10* (2013.01); *G10L 25/51* (2013.01); *H04M 1/72454* (2021.01); *H04W 4/029* (2018.02); *H04W 4/50* (2018.02); *G10L 25/78* (2013.01); *H04L 67/12* (2013.01); *H04W 4/38* (2018.02)

(58) Field of Classification Search
CPC .. G06K 9/6268; G06K 9/00536; G06N 20/10; G10L 21/10; G10L 25/51; G10L 25/78; H04M 1/72454; H04M 2250/12; H04W 4/029; H04W 4/50; H04W 4/38; H04L 67/12; A61B 5/1123; G01D 21/02
See application file for complete search history.

(56) References Cited

U.S. PATENT DOCUMENTS

| | | | |
|---|---|---|---|
| 10,976,337 B2* | 4/2021 | Chowdhary | ............ G06F 3/017 |
| 2011/0206219 A1 | 8/2011 | Pamler | |
| 2011/0316880 A1* | 12/2011 | Ojala | .................... G06T 19/006 |
| | | | 345/633 |
| 2012/0059780 A1* | 3/2012 | Kononen | .......... H04M 1/72403 |
| | | | 706/14 |
| 2012/0072381 A1* | 3/2012 | Cao | ......................... G06F 40/00 |
| | | | 706/12 |
| 2014/0156659 A1* | 6/2014 | Grokop | ............ H04M 1/72448 |
| | | | 707/737 |
| 2016/0253594 A1 | 9/2016 | Chowdhary et al. | |

* cited by examiner

ND CONTINUOUS EVENTS

BACKGROUND

Technical Field

The present disclosure relates generally to sensors integrated in a smart device, and more particularly, to providing context information of a smart device using information obtained by sensors integrated in the smart device.

Description of the Related Art

Currently, mobile phones and wearable electronic devices are equipped with fast processors capable of performing complex computation locally or in coordination with a cloud based server. The mobile device may also include multiple micro-electromechanical sensors (MEMS) that can enable the determination of various types of contextual information of the device's user. Some of the sensors useful for obtaining contextual information are accelerometers, barometers, gyroscopes, magnetometers and microphones.

Research work on motion activities has classified basic locomotion activities of a user such as walking, jogging, and cycling. Voice detection techniques use microphone recordings to detect human speech from background noise and are used in applications such as audio conferencing, speech recognition, and echo cancellation. The detection of the mobile device user's spatial environment has also been investigated to determine environment settings of the user, such as in the office, on the street, at a stadium, on the beach, etc.

BRIEF SUMMARY

The present disclosure is directed to a technique for determining probabilistic context of a smart electronic device for context-awareness based applications in, e.g., human-machine interaction (HMI) and an internet of things (IoT). The device includes various sensors integrated within the device. The technique detects and processes context data from the sensors and which includes, but is not limited to, motion activities of a user, sound information about the device that includes voice activities of the user and other sound information about the device, and spatial environment information surrounding the user. The technique differentiates between continuous events and transient events in each of a variety of different context domains about a smart device, such as, for example, motion activities of a user of the smart device, sound information about the smart device and the spatial environment where the smart device is used. The technique includes a base-level contact awareness analysis and a meta-level context awareness analysis. In the base-level analysis, two general categories of events, namely transient events or continuous events, are processed separately. Then the separately determined base-level context awareness results are combined in a meta-level processing to obtain the meta-level context awareness. The base-level context awareness results and the meta-level context awareness results are used by the smart device to automatically react to the context without human instructions or input.

Raw context data is detected by the various sensors integrated into or associated with the device. The raw data will be received and processed by a processor embedded in, i.e., local processing, or communicatively coupled to the device, i.e., remote processing by a cloud based server.

Specifically, for a transient event, two-step processing is conducted in the base-level context awareness analysis. The first step is to detect that some transient event happened. The second step is to determine the type of the transient event that happened. In determining the type of transient event, classification elements and classification parameters will be used. The classification elements include explicit types of transient events and a "none of these" type. The classification parameters include parameters of feature data that are corresponding to each explicit type of transient event. Different sets of feature data are obtained from the raw data for the first step and the second step analysis. Probabilistic determination of the type of base-level transient event is performed on the second step, the result of which may be output to the meta-level context awareness analysis.

In the meta-level context awareness analysis, the types of transient events and the continuous events are analyzed together at least one of on a concurrent basis ("concurrent analysis") or on a sequential basis ("sequential analysis"). The concurrent analysis evaluates the base-level transient events and continuous events that are determined as occurring or existing concurrently to enhance the probabilistic determination and to eliminate unreasonable base-level analysis results. The sequential analysis evaluates the base-level transient events and continuous events that are determined as occurring or existing sequentially to enhance the probabilistic determination and to eliminate unreasonable base-level analysis results. The sequential analysis also generates a sequence of events as updates in the context.

The technique includes new ways to detect physical context information by sensors, and collects such detected context information in a manner to fit the analysis of transient events in addition to continuous events that happen in the physical context of, or related to, a smart device. At least one of the results of the base-level context awareness and the meta-level context awareness are used by the smart device associated to the sensors or a remote server to configure the associated smart device to autonomously fit or react to the determined context.

The associated smart device may be any smart device that includes at least one of a local computing capacity or a capacity to be communicatively coupled to a remote computing capacity in a connected and distributed computing architecture. The smart device may be a smart phone, a smart appliance in a connected home, or a smart hub in an internet of things (IoT) application. The smart device may be coupled to the sensors through either local or remote data communication. A mobile device is an example of a smart device. Mobile device includes any smart device that is carried by a user to be "mobile".

These features, with other technological improvements that will become subsequently apparent, reside in the details of construction and operation as more fully described herein and clauseed, with reference being made to the accompanying drawings that form a part of the disclosure.

BRIEF DESCRIPTION OF THE SEVERAL VIEWS OF THE DRAWINGS

The present disclosure will be more fully understood by reference to the following figures, which are for illustrative purposes only. The figures are not necessarily drawn to scale, and elements of similar structures or functions are generally represented by like reference numerals for illustrative purposes throughout the figures. The figures do not describe every aspect of the teachings disclosed herein, and do not limit the scope of the clauses.

DETAILED DESCRIPTION

Figure 1:
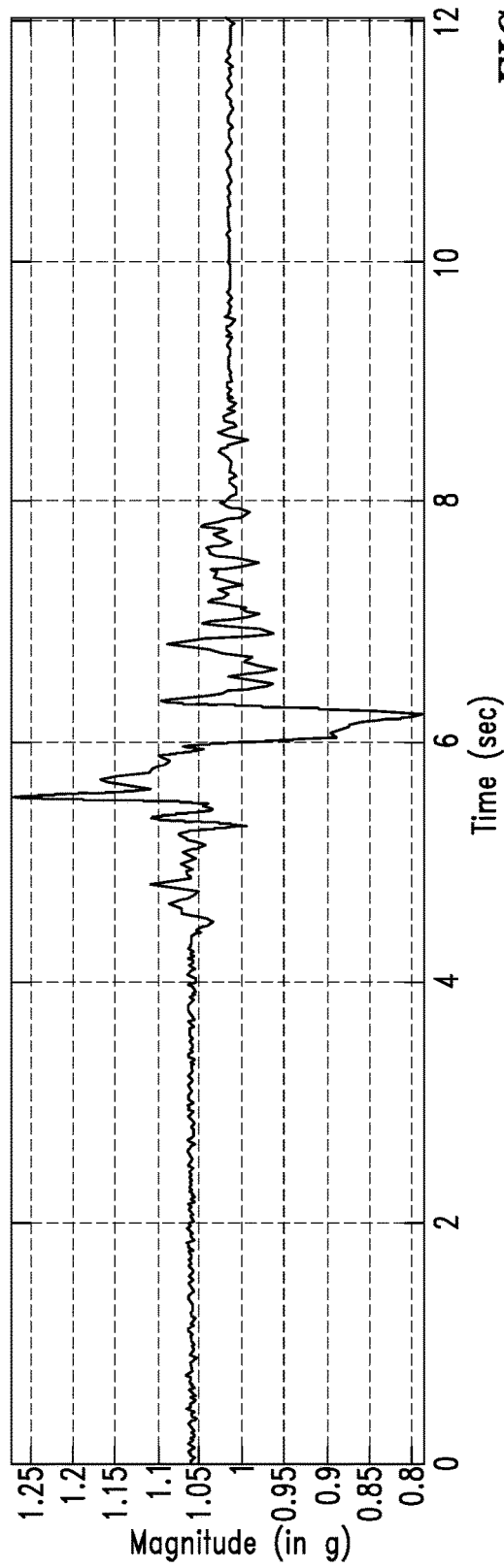
FIG. 1 illustrates example sensor data indicating an example base-level "stand-to-sit" transient event.

Each of the features and teachings disclosed herein may be utilized separately or in conjunction with other features and disclosure to provide a system and method for achieving context awareness by a smart device or smart system. Representative examples utilizing many of these additional features and teachings, both separately and in combination, are described in further detail with reference to the attached FIGS. 1-15. This detailed description is intended to teach a person of skill in the art further details for practicing aspects of the present disclosure, and is not intended to limit the scope of the clauses. Therefore, combinations of features disclosed above in the detailed description may not be necessary to practice the teachings in the broadest sense, and are instead disclosed merely to describe particularly representative examples of the present disclosure.

In the description below, for purposes of explanation only, specific nomenclature is set forth to provide a thorough understanding of the system and method for achieving context awareness by the smart device or smart system. However, it will be apparent to one skilled in the art that these specific details are not required to practice the teachings of the current disclosure. Also, other methods and systems may also be used.

1. Overview

With the development of machine learning and artificial intelligence, the continuous expansion of hardware capacities and the shrinking of hardware sizes, smart devices have the potential to become smarter, and autonomous. The disclosed technique provides a solution for the smart device to automatically detect and become aware of a context, identify context updates, autonomously configure and reconfigure itself to adapt to the context, or autonomously take an action in response to the context update. For example, for smart thermostats in a connected home, this technique enables a smart hub, which may be a mobile device or a smart control hub fixed in a home, to automatically detect and become aware that a homeowner has returned home, and to accordingly set the thermostat to a temperature favorable to or pre-selected by the homeowner.

With this technique, the homeowner no longer has to manually set the thermostat for different time periods of the day with different temperatures, and no longer has to manually give instructions through the mobile phone to control the thermostat. This technique enables the mobile phone or another smart device within proximity of the user to automatically detect the context of the user and the actions of the user, such as when the user opens the garage door, parks the car in the garage, and then enters the home. Such context awareness information will then be used to set the thermostat to the preferable temperature and humidity level specific to the homeowner.

As used herein, the context may be any physical circumstances about a smart device. The physical circumstances may include, but are not limited to, motion information, sound information and spatial environment information about the smart device, which are generally referred to as contextual information. For example, when a user is exercising, carrying a smart phone, such exercise activity may be motion context of the smart phone, the location of the exercising, e.g., a sports club, may be a spatial environment context of the smart phone, and the noises in the gym may be a sound context of the smart phone.

Because it is generally a sensor associated to a smart device that actually detects the context information, a context of the smart device is also referred to as a context about the sensor. It should be appreciated that a sensor may be integrated to a smart device or may be associated with a smart device through other links. For example, a sensor embedded into a wearable device, e.g., a smart watch, may be associated with a smart phone linked to the smart watch. Further, it is not necessary that the contextual information detected by a sensor of a smart device is only used for configuring the smart device. It is possible that context information detected by a sensor be processed by a first smart device to infer a context of a second device, and the second device be configured based on the determined context of the first device. For example, a sensor suite in a smart phone of a homeowner may detect context information and the smart phone may process the context information and determine that the homeowner enters the home, and such determined context information may be used to configure the connected thermostat to set up the room temperature.

A sensor's context may be detected based on periodic detection of continuous events and/or status and aperiodic event detection of transient events. As used herein, the term "event" may include anything that occurs in the context in a dynamic or stable nature. For example, walking is an event and standing still is also an event. A spatial environment is also an event in the sense that it occurs that a sensor is brought into the spatial environment. A continuous event may be any event that lasts a relatively long period of time, such as greater than 5 seconds. A transient event is an event that lasts a relatively shorter period of time, such as less than 1 second, and/or an event that indicates a change from a previous continuous event to a later continuous event. For example, walking and standing still both may be continuous events, and stop walking may be a transient event that intervenes between walking and standing still. For another example, talking and silence may both be continuous events, and starting to talk may be a transient event and may be intervening between continuous event silence and continuous event talking. The definitions of a continuous event and/or a transient event do not need to be fixed, and may be customized and/or dynamically updated.

The continuous events and transient events may be categorized based on a classification system. The classification system may include explicit classification elements, which each explicitly denotes a type of event, and a "none of these" classification element that denotes any event not explicitly denoted. The technique is flexible in adding or removing a specific explicit continuous event classification element and/or a specific explicit transient event classification element. The classification of continuous events and/or transient events may be customized and dynamically adjustable based on specific application and/or usage scenarios. The classifications of continuous events and/or transient events may be in any area of the context, including, but not limited to, the motion context, sound context and the spatial environment context of or about a smart device. The classification results about the continuous events and/or transient events in motion, sound and spatial environment around a smart device may be used to derive meta-level context awareness about the smart device.

Each explicit continuous event classification element and each explicit transient event classification element may be associated with a set of classification parameters which are predetermined data values and/or ranges of data values of a set of feature data obtained from the detected raw context data by the sensors. The classification parameters for the continuous events and/or the transient events may be clustered together into a library of classification parameters, which can be stored in a memory in the smart electronic device or accessible through a remote server, such as a cloud based server. Such library of classification parameters may be set up for continuous events and transient events separately, and may also be set up for various context domains, e.g., motion context, sound context, spatial environment context, separately. Further, it is not necessary that classification parameters and a classification element are in a same context domain, e.g., motion, sound, spatial environment. Note that the context domain (or "context domain") is defined based on the actual context of a user and may be defined flexibly based on the specific applications of context awareness purposes. Sensors may be configured to detect data on a specific context domain, e.g., accelerometer for motion data. For example, parameters of sound-related feature data may be used for a classification element of a walking event, which is in motion context. Parameters of spatial environment-related feature data may also be used for the classification of the walking event. For example, walking event classification may include a terrain flatness classification parameter. If it is determined through a barometer that the altitude of the terrain increases sharply, which is a spatial environment context, a motion activity of the associated user is unlikely to be walking but more likely to be climbing.

The base-level context awareness analysis includes determining a classification of a continuous event and/or a transient event, if any, based on probabilistic analysis using contextual information detected by sensors and one or more of existing continuous event classification, existing transient event classification, parameter library for continuous event classification and/or parameter library for transient event classification.

The base-level context awareness analysis results, namely, the probabilistic classifications of the continuous events and the transient events, may then be combined in the meta-level context awareness analysis.

Figure 7:
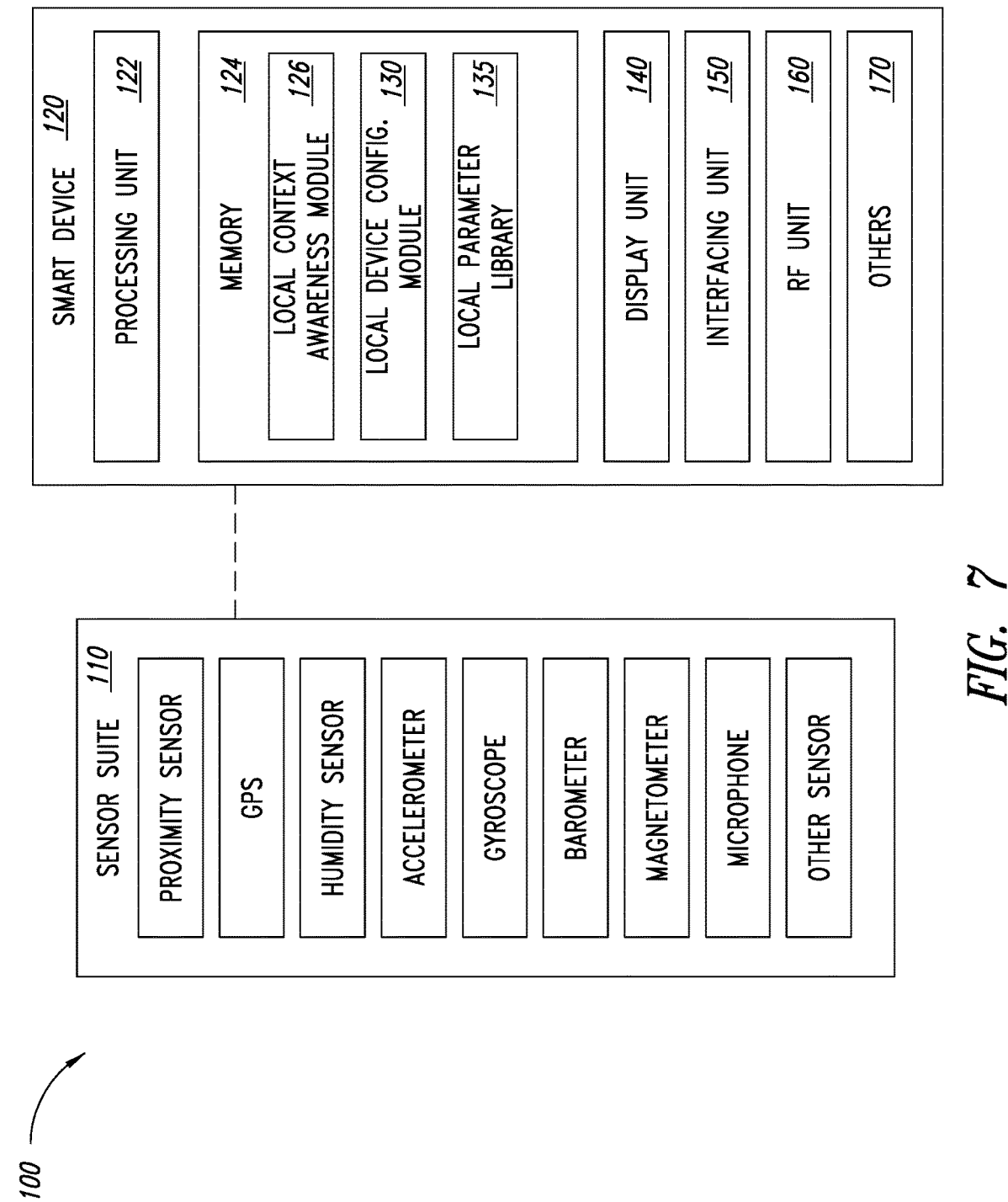
FIG. 7 illustrates an example smart device with an associated sensor suite.

A mobile device may be used as an illustrative example of a smart device to further describe the context awareness technique. An example mobile device (as an example of a smart device), e.g., as illustrated in FIG. 7, may include a sensor suite which includes numerous sensors such as an accelerometer, a barometer, a gyroscope, a magnetometer, a GPS, a light sensor, a proximity sensor, a microphone, etc. The contextual information regarding the context of the mobile device may be obtained from these heterogeneous sensors. The sensor suite may include multiple sensors which are required for the detection and recognition of particular contexts. For example, uniaxial, bi-axial and tri-axial accelerometers, barometers, gyroscopes, magnetometers, and microphones can detect and provide input for raw context data for determining continuous and transient motion activities of the user carrying the mobile device. For example, a single microphone or an array of microphones could be used to detect and provide raw context data for sound context, e.g., voice activity of the user or human voice activities about the user's device. A microphone, proximity sensor, light sensor, barometer, gas sensor, UV sensor, humidity sensor, etc., may be used to detect and provide input for spatial environment context data, namely the spatial environment surrounding the mobile device.

Deterministic inputs from sensors or other components of a mobile device, such as a clock, GPS, or Wi-Fi, may also be used in determining the context of the mobile device. A clock in the mobile device may provide the date and time. GPS signal strength and Wi-Fi signal strength could provide the location information of the mobile device. For example, GPS signals may provide outdoor location information. Wi-Fi signal strength may be used for indoor positioning.

The sensors detect and provide raw data of the context of the mobile device. Raw data received from the sensors may be pre-processed to extract the required data. Various signal processing algorithms and techniques may be implemented in the pre-processing, and all are included in the disclosure.

Among all pre-processing techniques, a data filtering may be performed on the raw context data to remove noises. For example, for determining a human voice context of a mobile device, any raw sound data that has a frequency higher or lower than the range of sound frequency of a human voice may be treated as noise and filtered out in the data pre-processing. The noise cancellation may use high-pass or low-pass filters and may also include filtering elements to reduce offset noises. It should be appreciated that noise filtering is dependent on the specific context awareness tasks and a piece of raw data may be noise in one context determination task but may be valuable information for another context awareness task.

The pre-processing may also include adding time information to the raw data. The time information may indicate when the raw data is received by the smart device and/or when the raw data is obtained by the sensors.

The pre-processing may also include filtering the raw data based on various criteria. For example, the raw context data may be filtered based on a characteristic of a human activity in the context. For example, for human voice-related context data, any sound information that includes a sound frequency outside of 100 Hz to 8 KHz may be treated as noise and filtered out.

After the pre-processing of the raw data, which may be conducted locally by the smart device, the context data may then be further processed for context awareness. The context awareness analysis may be conducted locally by the smart device or may be done remotely by a server.

Feature data will be obtained from the pre-processed context data. In obtaining the feature data, a series of time windows may be applied. The time windows may be selected based on areas of the context data, e.g., motion, sound, or spatial environment context. The time windows may also be selected based on the sensors that detect the data. For example, smaller time windows may be applied to accelerometer data than to barometer data because altitude change normally occurs slower than horizontal speed change. In an embodiment, everything else being equal, the time windows used to obtain feature data for detecting and/or classifying a transient event are shorter than the time windows used to obtain feature data for classifying a continuous event. Reasons include that a continuous event lasts longer than a transient event in the same context area and does not need the same high-frequency data processing associated with the shorter time windows. For example, for the same motion context data detected by an accelerometer, shorter time windows, e.g., less than two second, are applied for determining motion context transient events, and longer time windows, e.g., longer than 5 seconds, are applied for determining motion context continuous events.

With time windows applied, feature data are extracted from the sensor data for conducting posteriorgram probability analysis of the continuous event classification and for detecting a transient event. The extracted feature data correspond to the relevant classification parameters in the classification parameter library, which in turn correspond to explicit classification elements. For example, if motion area context is the target of the analysis, feature data that corresponds to the classification parameters for motion area event classification elements will be extracted. If sound area context is the target of the analysis, feature data that corresponds to the classification parameters for sound area event classification elements will be extracted.

The example context of a mobile device could be illustrated with examples of motion activity of the user, voice activity of the user or human voice activities around the user's device and spatial environment around the device. The human motion activity, voice activity and spatial environment can be classified based on their continuous/repetitive nature, namely continuous events, or sporadic intermittent nature, namely transient events. Thus, each of the example elements of the context, namely human motion activity, voice activity and spatial environment, may be classified as a continuous motion event, a continuous voice event, a continuous event in spatial environment, a transient motion event, a transient voice event and a transient event in spatial environment.

Continuous motion and voice events of the user and in the spatial environment around the user are for relatively longer time durations compared to the transient events that exist for very small time durations. Continuous motion and voice events of the user and in the spatial environment around the user may change over much longer time scales, for example, typically over several seconds or minutes. The spatial environment may surround the mobile device for a shorter duration of time, namely a transient event, or surround the mobile device for a longer duration of time, namely a continuous event. Transient events in the user's motion and voice activities may take place for very short durations of time. It should be appreciated that there is no fixed threshold on the time duration that would separate continuous events from transient events. For example, generally, the continuous motion and voice event of the user and in the spatial environment around the user can be expected to exist for five seconds or more, whereas transient events in the user's motion, voice and spatial environment may appear sporadically and may be of shorter duration, and typically last less than one second in time. Transient events in the user's motion, voice and spatial environment may also signify transition between two continuous motion events of the user, two continuous voice events about the user or two continuous spatial environments surrounding the user. For example, sitting and standing are continuous motion activities as the activities are performed for a relatively longer duration of time, while sit-to-stand or stand-to-sit are transient motion events as they are transitory in nature and are of very short time duration. As the transient events in the user's motion, voice and spatial environment are sporadic in nature and occur aperiodically, feature data are first extracted to determine whether a transient event occurs in the context before a posterior probability analysis is conducted to classify the transient event, using additional and/or alternative feature data extracted from the pre-processed context data detected by the sensors.

FIG. 1 shows example signal magnitude waveforms of a tri-axial accelerometer demonstrating a transient motion event of stand-to-sit. The transient event is aperiodic in nature and occurs for a very short duration of time, shown as about two seconds. The technique first detects that a transient event occurs and then obtain the posteriorgrams of event classification.

Figure 2:
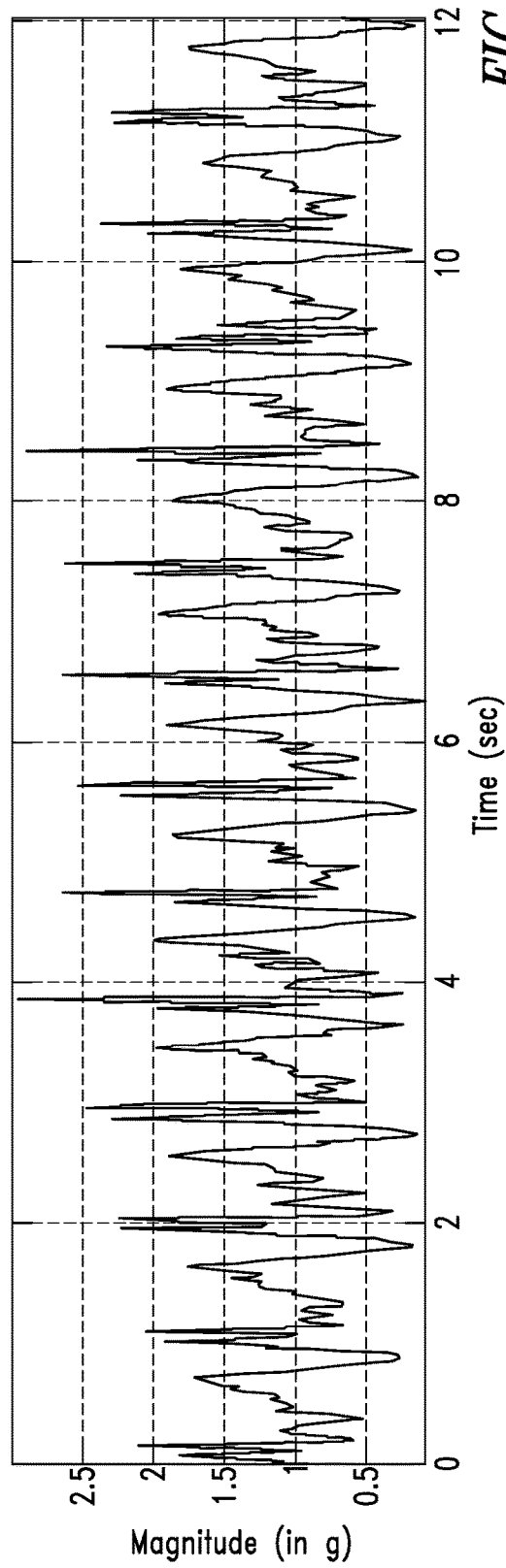
FIG. 2 illustrates example sensor data indicating an example base-level "walking" continuous event.

Distinct frameworks are used for continuous events in the user's motion, voice or the spatial environment and for transient events in the user's motion, voice and spatial environment such that separate processing for continuous events of the user and for transient events of the user achieves more accurate results. As continuous events in motion, voice and the spatial environment about the mobile device are assumed to be present at each time instant except the time points for transient events, there may be no separate processing to detect the presence of a continuous event. Feature data may be extracted and processed directly to estimate the classification of the continuous events based on posterior probabilities in the respective posteriorgrams. An algorithm is designed accordingly to provide the posteriorgram's analysis directly without first detecting the presence of a continuous event in motion, voice or the spatial environment about the user. FIG. 2 shows an example signal magnitude waveform of a tri-axial accelerometer for the continuous motion activity "Walking". The continuous motion activity occurs for longer duration of time.

The classification elements of the continuous events and the transient events are grouped into vectors that represent the example motion context, sound context and spatial environment context. Separate vectors for continuous events in motion, voice events and the spatial environment, and for transient events in the motion, voice and spatial environment are used to account for the inherent differences in the nature of each of the vectors. Such grouping into the vectors for the event classification also facilitates data processing of the corresponding sensor signals to extract the corresponding feature data.

The classification elements, herein also referred to as "class"/"classes", within each of the motion vectors are mutually exclusive of one another. For example, for the continuous motion vector, "walking" class and "standing still" class are exclusive to each other because a user cannot walk and stand still at the same time. Classes in continuous motion vector and transient motion vector are also mutually exclusive. For example, a user cannot conduct "walking" class of continuous vector and "stop walking" class of transient vector at the same time. Each vector also has a "none of these" class representing the remaining events of each vector that are not explicitly incorporated as classes. This "none of these" class allows the sum total of probability of the elements of a vector to be equal to one, which facilitates mathematical calculation.

Vector for continuous motion events may be referred to as "Motion Activity Vector" (MAV). Elements of MAV vector represent the continuous motion activity of the user or the absence of it. That is, no motion is also a continuous motion event.

A separate vector, Motion Transient Vector (MTV), may be used for transient motion events, which contains all explicit classes of the transient motion events and a "none of these" class for other transient motion events.

For example, Motion Activity Vector (MAV) may include classes of [Walking; Cycling; Stationary; Upstairs; Downstairs; Jogging; In-Vehicle; Elevator Up; Elevator Down; None of these].

The classes of Motion Transient Vector (MTV) represent motion activities of very short duration and/or transitory nature. For example, Motion Transient Vector (MTV) may include classes of [Sit to Stand; Stand to Sit; Lie to Sit; Sit to Lie; Lie to Stand; Stand to Lie; Falling; Stand to Squat; Squat to Stand; Exercise; Handshake; Throwing an object; Pulling; Pushing; None of these].

The various classes of continuous spatial environment that provide exact inference of a mobile device user's spatial environment and are useful for higher level of inferences would be included in Spatial Environment Vector (SEV). Depending upon the need of specific applications, the SEV elements can be chosen selectively. For example, instead of explicit elements of spatial environment, the SEV may be chosen to contain only "open space" or "enclosed space" as the two elements.

For example, Spatial Environment Vector (SEV) may include classes of [Street; Nature; Beach; Stadium; Office; Mall; Home; None of these].

Spatial Environment Transient Vector (SETV) is a vector consisting of transient events that happen in the spatial environment. Their detection and probabilistic information may have significant importance in describing particular aspects of the use context of the mobile device.

For example, Spatial Environment Transient Vector (SETV) may include classes of [Doorbell; Start of Engine; Knocking on door; Falling of utensil; Footsteps; Whistle of pressure cooker; Closing of door; Clapping; Micro-oven Beep; Printer Sound; Mouse Clicking; None of these].

Apart from sound signals that describe spatial environment, human voice may be valuable for context awareness about the use context of the mobile device. Classes of human voice that are continuous in nature are included in the Voice Activity Vector (VAV) and classes of human speech that are transient and intermittent in nature are defined in the Voice Transient Vector (VTV).

For example, Voice Activity Vector (VAV) may include classes of [Silence; Face-to-Face Talking; Telephone Conversation; Multiple Party Conversation; User Speaking; Another Person Speaking; Background Conversation; None of these].

Voice Transient Vector (VTV) may include classes of [Cry; Whistle; Shout; Call-out; None of These].

Rules may be applied to define the properties of transient vectors MTV, VTV and SETV and their relation with the continuous state vectors MAV, VAV and SEV. For example, it may be stipulated that:
for each transient event vector, only one "class" or element is possible at a given time point, i.e., all elements in a transient event vector are mutually exclusive;
the elements of MAV and MATV cannot occur simultaneously; and/or
the transient events may or may not be present at each instant of time.

The "none of these" class in each vector represents all the remaining classifications of each vector that are not explicitly incorporated as classification elements in the respective transient vectors. This allows the sum total of probability of all the elements of a vector to be equal to one, which facilitates mathematical calculation. Also, this "none of these" class makes the vector representation flexible so that new classes can be explicitly incorporated in the respective vectors as required, which will only change the constitution of the "none of these" class of that vector.

It may be assumed that only a single event is true in the SETV vector at any given time instant. Also, to make the representation as compact as possible, all continuous sounds, like a fan, an air-conditioner, etc., may be included either explicitly or implicitly in classification elements in the SEV.

A classification element/class in the MTV, VTV, SETV vectors is generally shorter than a classification element in the MAV, VAV, SEV vectors, respectively.

A general comprehensive framework for the representation of information about the context of a device user would be useful for several applications. The framework would provide the probability of the likely activity or event from respective vectors as a function of time. These can be estimated as a posteriori probabilities of each class/element of the MAV, MTV, VAV, VW, SEV and SETV vectors at a given time based on the "observations" that are the feature data extracted from the raw sensor data. The corresponding vectors of time sequence of posterior probability values are the respective "posteriorgrams", i.e., Motion Activity Posteriorgram (MAP), Motion Transient Posteriorgram (MTP), Voice Activity Posteriorgram (VAP), Voice Transient Posteriorgram (VTP), Spatial Environment Posteriorgram (SEP) and Spatial Environment Transient Posteriorgram (SETP) that are the analysis outputs of the base-level context awareness information. Specifically, the a posteriori probabilities may be obtained by comparing the obtained feature data with the corresponding classification parameters to estimate the likely classification of the events.

A transient event is of short duration but may possess the ability to carry substantial information about a particular context, and thus increase the accuracy of overall context awareness in a certain scenario. For example, the falling of a utensil in SETV may signify the spatial environment of home, and thus reinforce the result being obtained from SEV. In another example, the sound of honking of a vehicle in SETV would reinforce with the spatial environment of street. Thus, the detection and classification of a particular transient event could improve the confidence in overall context awareness result, thus making decision making of the context awareness and the related autonomous reaction to the context more robust. The processing to obtain the posteriorgrams for the SEV and SETV are different due to the different nature of the underlying sensor signals, the most prominent one being the duration of occurrence of the respective classification elements. Motion Transient Event (MTV) may also signify the change from one continuous state to another continuous state. For example, a transient event of Sit-to-Stand signifies the change in state from sitting to standing.

Each explicit class/classification element, namely a class in a vector other than the "None-of-These" class, may be associated with a set of classification parameters in the classification parameter library. The posteriorgram for the explicit class may be obtained by comparing the relevant feature data with the classification parameter of the class to obtain a value representing how likely the detected event belongs to this class of event.

For example, the classification element "Walking" in the continuous motion vector may be associated with classification parameters in the below feature data extracted from the raw data of an accelerometer:
 a. mean of the signal magnitude in frame;
 b. maxima of the signal magnitude of the frame;
 c. minima of the signal magnitude of the frame;
 d. Root Mean Square (RMS) of the signal magnitude of the frame;
 e. three Cumulative plot features:
  mean Minima, defined as the mean of first 15% data.
  mean Middle, defined as the mean of data between 30% to 40% portion.
  mean Maxima, defined as the mean of data between 80% to 95% portion;
 f. ten LPC coefficients, the coefficients of the 10th order linear predictor.

For another example, for class "Sit-To-Stand" in the Motion Transient Vector, the classification parameters may include a unique plot shape of accelerometer signal magnitude in the duration of the event. The obtained feature data of accelerometer signal magnitude may be plotted and compared to the unique plot shape to determine the posteriorgram, namely the probability value, of the detected transient event being a "Sit-To-Stand" class.

It should be appreciated that the above examples of the vectors are provided for illustrative purposes only, which do not limit the scope of the disclosure. Vectors of continuous and transient event classification may be created for the motion, sound, and spatial environment context variously, and all are included in the disclosure. For example the voice vectors VAV and VTV are specifically for human voice events, which is an example of sound context. Vectors for sound context could include other classes.

Accordingly, the classification parameter library may also be customized in various approaches. For example, the classification parameter library may also be customized for a user, for a specific geographic location, and/or for a specific time in a day, in a month, or in a year.

After the possible classifications of continuous events and transient events are determined at the base-level analysis, meta-level analysis may be performed based on the results of the base-level analysis, namely the determined event classifications. Meta-level context awareness can be derived from base-level posteriorgram information about the continuous events in motion, sound, and/or spatial environment and the transient events in them. For example, if a sequence of events is detected and determined by base-level posteriorgram analysis as transient events of switching off of a car engine, opening a car door, or sit-to-stand followed by a continuous walking event, meta-level analysis may generate a meta-level decision that a person has parked his car and left the car. Such meta-level awareness may be used to configure the mobile device to automatically determine, via GPS and/or indoor location techniques, and store the parking location of the car for the user to easily locate the car at the parking lot later. In another example, if motion activity is detected as continuous sitting, and spatial environment is detected as lecture/conference room, and thereafter a transient event of sit-to-stand is detected, followed by continuous walking to spatial environment "Open Environment", meta-level analysis results could signify the end of a meeting or lecture. Based on this meta-level context awareness, the mobile phone could be configured to automatically switch from silence to general use mode and to actively notify the user of a subsequent calendar task.

Figure 3:
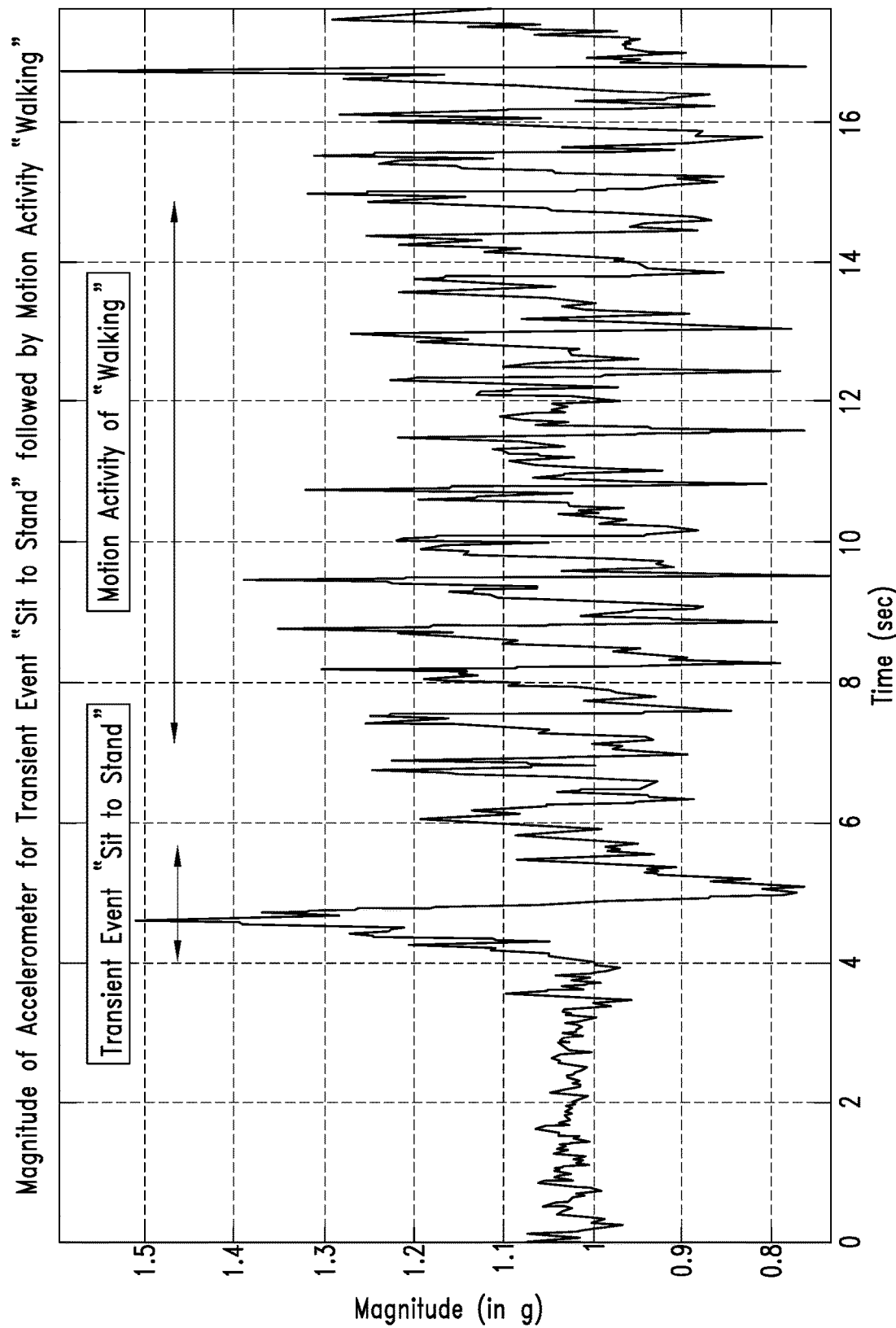
FIG. 3 illustrates example sensor data indicating an example meta-level sequence of a transient "sit-to-stand" event followed by a continuous "walking" event.

FIG. 3 shows the signal magnitude waveform of a tri-axial accelerometer demonstrating the transient motion event of a person standing up from a sitting position followed by continuous motion activity of walking. This is a practical scenario where a transient motion event and continuous motion events occur one after the other. As discussed herein, the transient event of sit-to-stand occurs at a random time instant and does not repeat periodically. Thus, there exists a need to first detect that a transient event occurs and then classify it. The continuous motion activity of walking is one of the activities of the MAV, and there is no need to first detect the presence of a continuous motion activity.

As described herein, at the base-level analysis, the posteriorgram probabilities in the form of classification elements within the respective vectors are processed and output periodically for the continuous events in the motion, sound and spatial environment context, while the posteriorgram probabilities in the form of classification elements within the respective transient vectors are processed and output aperiodically upon transient events being detected in the respective context.

Figure 4:
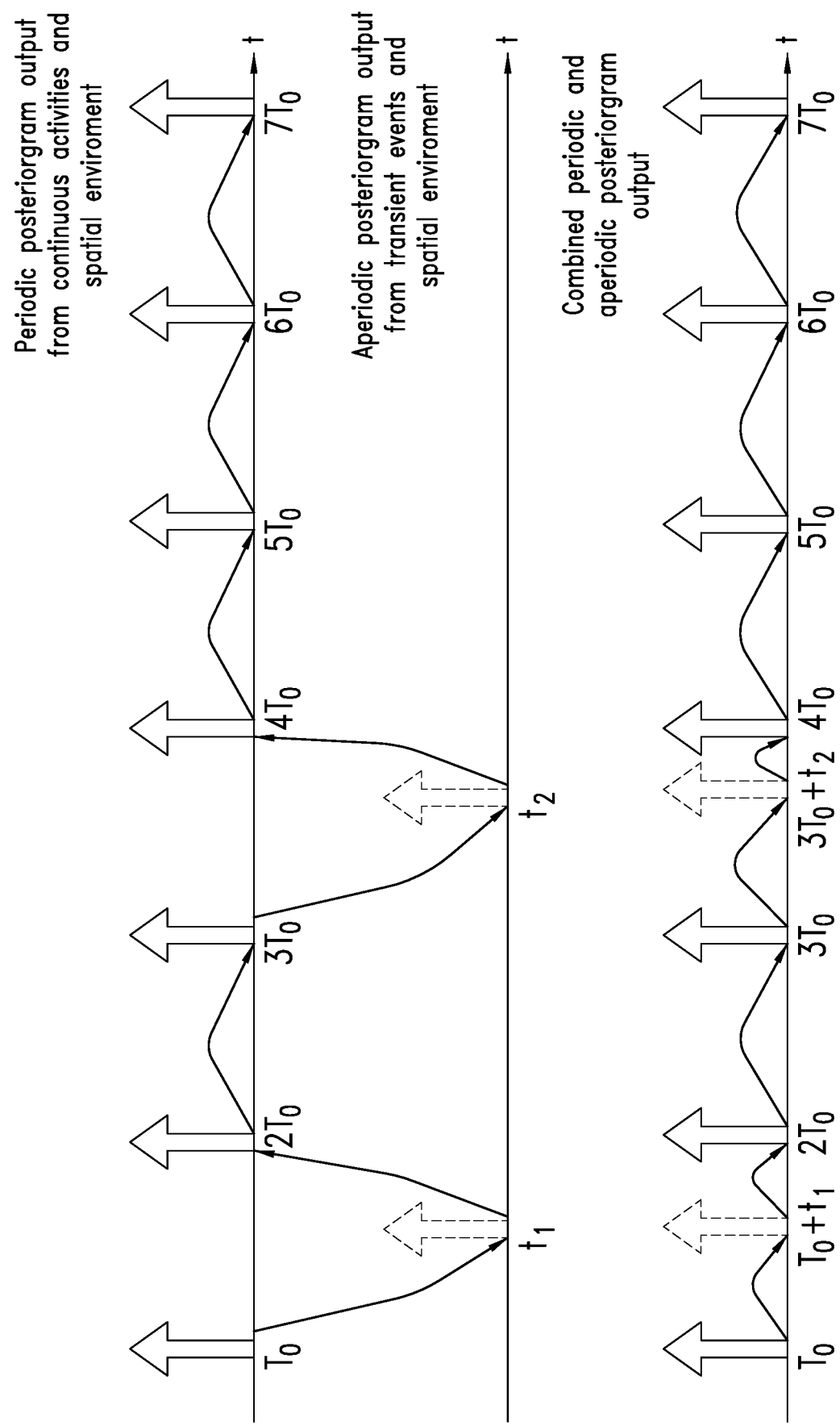
FIG. 4 illustrates an example combination of continuous events with transient events in a meta-level context awareness analysis.

FIG. 4 shows the method for combining periodically processed posteriorgrams of continuous events in motion, sound and the spatial environment context with aperiodically processed posteriorgrams of transient events in motion, sound and spatial environment for meta-level analysis. Continuous motion, sound and spatial environment posteriorgrams are obtained periodically with time interval $T_0$. The top subplot displays the posteriorgrams obtained periodically at each interval $T_0$ seconds. Transient events are instantaneous of short duration and hence are obtained aperiodically. As shown in the middle subplot, the time points (or very short time durations) $t_1$ and $t_2$, when transient event posteriorgrams are obtained, are within time interval $T_0$, i.e., $t_1, t_2 < T_0$. The bottom subplot displays the combined posteriorgrams in the meta-level context awareness analysis. The combination of periodic posteriorgrams or their derivative classification decisions of continuous events in motion, sound and spatial environment, and aperiodic posteriorgrams or derivative classification decisions of transient events in motion, sound, and spatial environment, forms the basis for further processing at the meta-level context awareness analysis.

To describe a base-level context analysis of a smart device, the example vectors Motion Activity Vector (MAV), Motion Transient Vector (MTV), Voice Activity Vector (VAV), Voice Transient Vector (VTV), Spatial Environment Vector (SEV) and Spatial Environment Transient Vector (SETV) are used. The meta-level context awareness analysis considers that human activity is diverse and the context is a complex derivative of the base-level context information available from the different sensors. The meta-level context awareness analysis would analyze base-level continuous and/or transient events that occur in sequential manner, or events that occur concurrently or in interleaved manner. For example, concurrent events may include a person watching television and talking to another person face-to-face or on the phone. Example sequential events may be that a person is exercising and pauses to talk to another person face-to-face or on the phone and then resumes exercising. Also, the determination of single base-level context events in some scenarios may be ambiguous and may generate multiple possible interpretations, i.e., likely classifications, due to insufficient inputs, for example. When the single base-level event classification is fit into a sequence of activities, some ambiguities may be removed as being not logically linked to the events before and/or after the ambiguous event. For example, if it is determined that a sequence of events includes "stop car engine", "walk for a short distance", "open door (or open car door)", "walk for another short distance", and "sit down into sofa (or sit into car)", the uncertainty between "open door" and "open car door" and between "sit down into sofa" and "sit into car" can be logically removed because it may be less likely that a person stops the engine, walks for a short distance, opens car door, walks for another distance, and then sits back into the car. The meta-level context awareness analysis based on base-level posteriorgram classification information can be achieved with suitable information processing frameworks such as finite state machines.

As an illustrative example, the base-level context awareness is mainly obtained from the posteriorgrams of Motion Activity Vector (MAV), Motion Transient Vector (MTV), Voice Activity Vector (VAV), Voice Transient Vector (VTV), Spatial Environment Vector (SEV) and Spatial Environment Transient Vector (SETV). Depending upon the specific meta-level analysis, some or all of the available base-level posteriorgram probabilities may be used. Based on the requirements of the meta-level application, the classification vectors of continuous events in motion, sound and the spatial environment, and classification vectors of transient events in motion, sound and spatial environment may be included in the meta-level analysis. The elements of MAV, MTV, VAV, VTV, SEV, and SETV are also flexible and may be selected based on the requirements of the meta-level context to be detected.

Different methods could be used to derive meta-level context awareness from the base-level event classifications, including, but not limited to, Deterministic Finite Automaton (DFA), Hierarchical Hidden Markov Model (HHMM), N-gram model, decision tree, Probabilistic Graphical Models (PGM), Bayesian Network (BN), Dynamic Bayesian Network (DBN), etc. Choice of method used to derive meta-level context awareness from base-level event classifications depends upon suitability of the use of statistical model or graphs to be used for a particular application, and output requirements, e.g., outputs in the form of hard decision or soft decision. For example, a Finite State Machine analysis may be used. The information in the state transition matrix could be graphically demonstrated in a state diagram.

Figure 5:
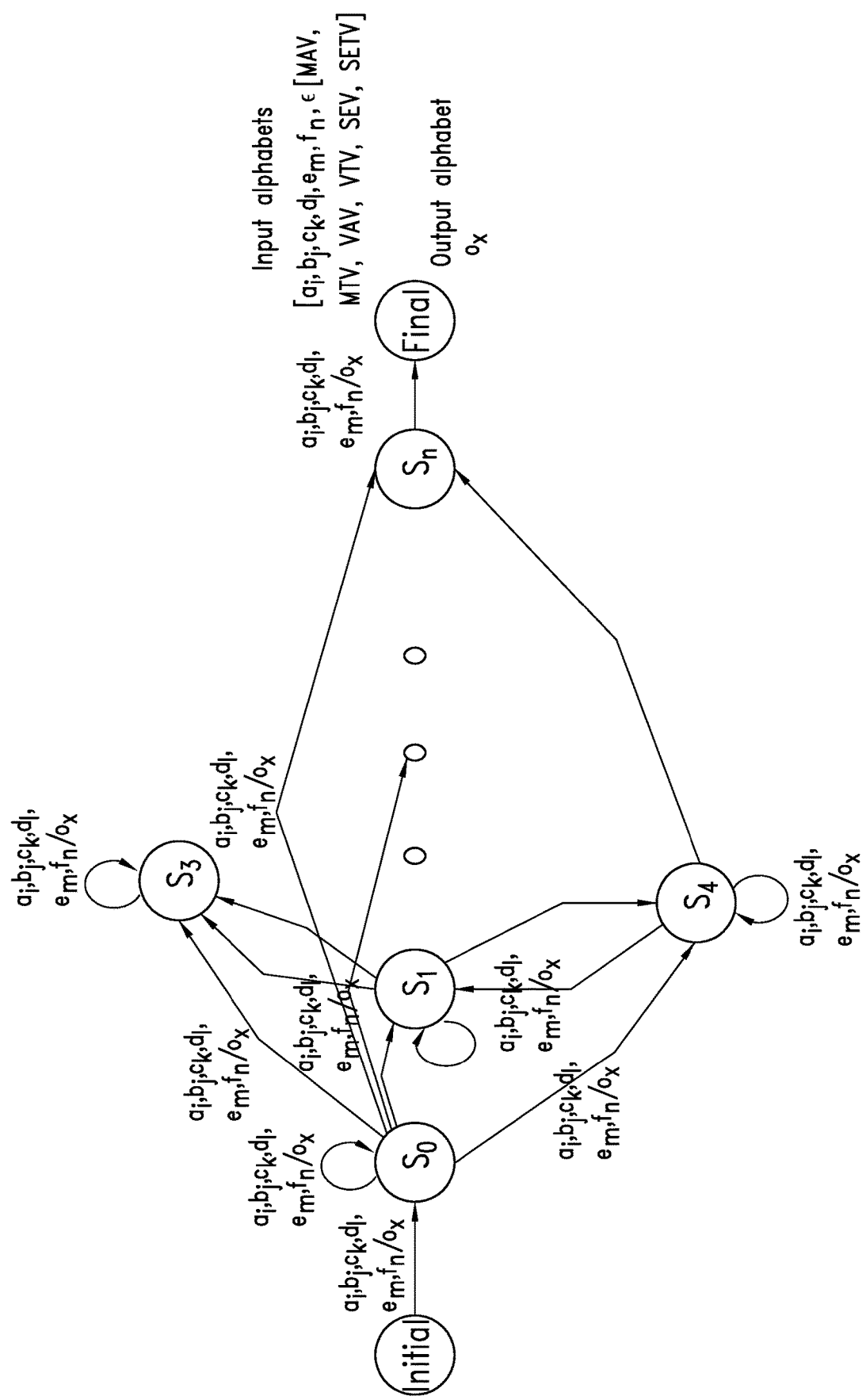
FIG. 5 illustrates an example finite state machine operation in example meta-level context awareness analysis.

FIG. 5 shows an example generalized finite state machine (FSM) for a meta-level analysis based on the base-level posteriorgram analysis results.

A subset from the set of elements of the vectors MAV, MTV, VAV, VTV, SEV, SETV form the input alphabet. Let the input alphabet be denoted by the vector $I=[a_i, b_j, c_k, d_l, e_m, f_n]$, where the respective elements are the $i^{th}$ element of MAV, $j^{th}$ element of MTV, $k^{th}$ element of VAV, $l^{th}$ element of VTV, $m^{th}$ element of SEV, and $n^{th}$ element of SETV. These elements form the input alphabets of the FSM. Depending upon the current state and input alphabet at time t, the next state and output alphabet are decided. For detecting a meta-level context, a state diagram may be designed which may encompass all possible scenarios.

Figure 6:
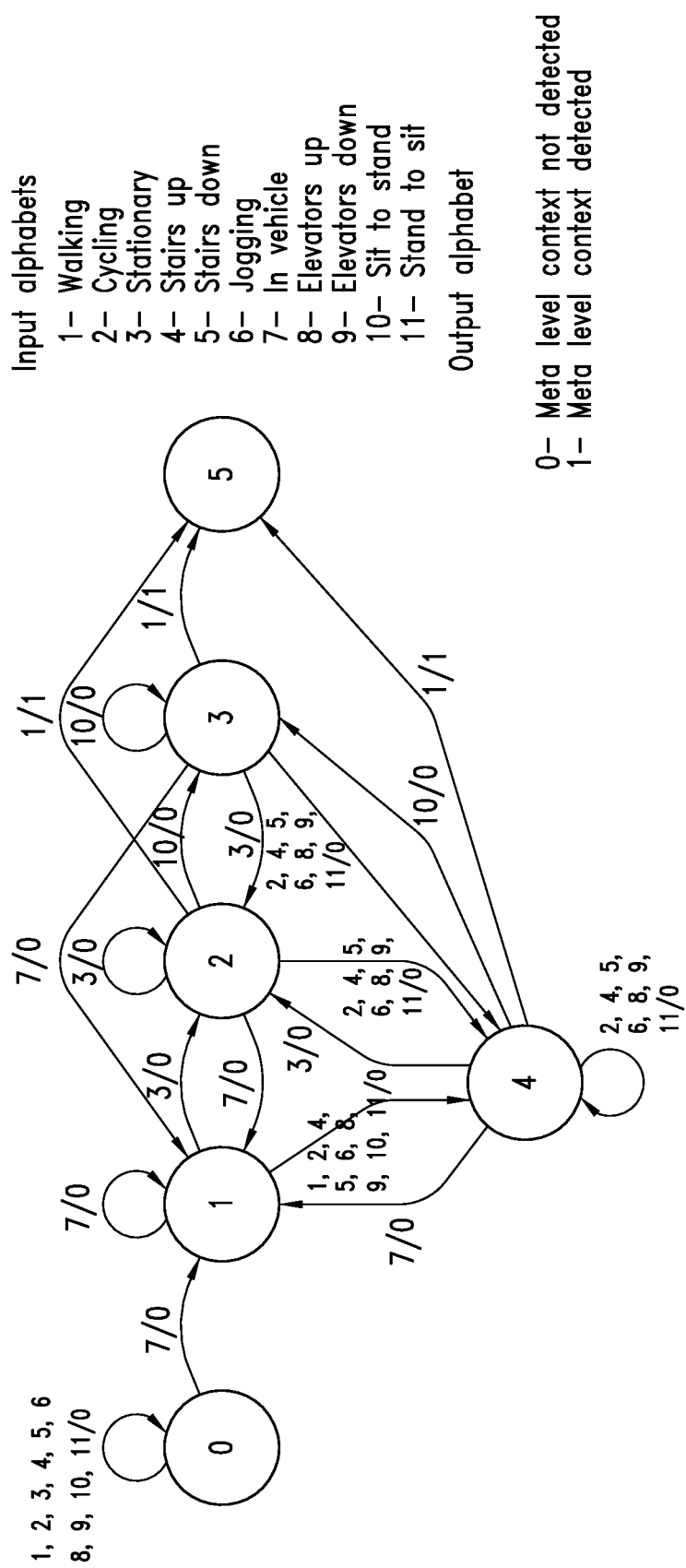
FIG. 6 illustrates an example finite state machine operation in meta-level context awareness analysis with respect to example motion vector events.

To illustrate the derivation of meta-level context awareness from base-level context awareness results in the form of posteriorgrams and decisions of motion/sound/spatial environment events of the respective vectors, an illustrative example is provided in FIG. 6. In the illustrative example of FIG. 6, it is assumed that the actual sequence of events in the context of a mobile device is: a user driving a car, coming to halt, getting off the car, and walking away. The detection of this sequence of context updates may lead to the automatic configuration of the mobile device, for example, to determine and save the location of the parked car for the ease of the user. The base-level context awareness analysis results are obtained from base-level posteriorgrams based on context data detected by the sensors associated with the mobile device.

FIG. 6 gives an illustrative example that demonstrates the derivation of meta-level context awareness from base-level context analysis results, namely, event classifications, using a Finite State Machine (FSM). The FSM is a 6-tuple consisting of i) initial state $S_0$, ii) final state $S_L$ where L for this particular example is 5, iii) finite set of input alphabet input $p_j$, $j \in 1, 2, \ldots, M$ where M for this example is 11, iv) output alphabet $k \in 0, 1, \ldots N-1$ where N is 2 for particular example, v) a set of accept states $S_i$ where $i \in 1, 2, \ldots, N-1$, and vi) a transition function ($\delta: S_i \times p_j \rightarrow S_{i+1}$). FIG. 6 is a state diagram which compactly displays the transition from one state to another as a function of the input alphabet received and its corresponding output produced. In this example, the inputs are the elements/classes of continuous motion events and transient motion events.

As the MAV and MTV are mutually exclusive, i.e., their classification elements/classes cannot occur simultaneously, all the elements of the two vectors are taken as the input alphabets. State 0 is the initial state and State 5 is the final state in the FSM. When continuous motion event of "in-vehicle" is determined using the posteriorgrams of the MAV, referred to as "MAP", the state machine goes from Initial State 0 to State 1, else it remains in initial state. After the "in-vehicle" continuous motion event is obtained, if the motion activity "stationary" is detected using the MAP, then the FSM changes to State 2. The "stationary" state signifies that the car has come to a halt. After coming to a halt, the user leaves the car. This action is first detected as a transient motion event that is thereafter classified as a "sit-to-stand" event using the posteriorgrams of the MTV, referred to as "MVP". Finally, the user walks away from the car that is obtained as a continuous motion activity of "walking" using the MAP. The state machine is designed such that if the car stops, e.g., at a traffic signal, and again resumes, the state machine is able to accommodate it properly. Also, the state machine is reasonably robust to handle any spurious data received or incorrect decisions that may be taken on the base-level posteriorgrams.

The bag-of-words model is a simple representation in which there exist multiple sets of elements from different activity/spatial environment/transient event vectors, and the sequence of occurrence of these vectors is of no importance. For example, multiple sets of transient events like alarm sound, glass breaking sound, crying sound, screaming sound from the SETV would signify a meta-level context of an emergency and a meta-level analysis could be built upon it. Generally, the meta-level context could be derived from the detection of continuous events and/or transient events in the motion, sound and spatial environment context about the mobile device.

Apart from the base-level analysis results, namely the probable classes of events, deterministic sensor inputs like date and time, GPS location, etc., may also be useful for meta-level context awareness analysis. Further, the deterministic sensor input may facilitate the probabilistic context awareness analysis. For example, the deterministic information, like a time and a geographic location of the context, may be considered in at least one of the determining that a transient event happens in the context and the determining the classification of the transient event.

The above examples explain the advantages of detecting and classifying transient events in addition to continuous events in motion, and the sound and/or spatial environment context of sensors integrated into or associated with a smart device. With the transient event properly detected and classified as specified in the present technique, many fields other than sensors and the associated data processing may be benefited. For example, the field of the connected home will be benefited by autonomously adapting the appliance settings to the context detected and classified using the present techniques. The fields of robotics may also benefit from the present techniques to improve the awareness of the circumstance, i.e., context, of a robot machine. The field of artificial intelligence may be benefited by being able to link a user's manual decision makings and actions in certain scenarios to the detected contexts and circumstances. Other technical advantages of the disclosed techniques are also appreciated by people of ordinary skills in the art.

2. Example Systems

FIG. 7 illustrates an example local system 100 for determining a context of a sensor associated with a smart device. In this example, system 100 may include a sensor suite 110 and a smart device 120. Sensor suite 110 may be integrated in smart device 120 and/or may be communicatively and/or electrically coupled to smart device 120. Sensor suite 110 may include various sensors for detecting various context data. The various sensors may include, but are not limited to, a proximity sensor, a satellite based positioning sensor (e.g., a GPS sensor), an environmental sensor (e.g., a gas sensor and/or a humidity sensor), one or more motion sensors, shown as an accelerometer and a gyroscope, a barometer, a magnetometer, a microphone and other sensors. The various context data may include at least one of motion, sound and spatial environment information of the context.

Smart device 120 may include a processing unit 122, e.g., a general or special purpose processor or a micro controller (MCU), and a memory 124. Memory 124 may store computer executable instructions which, when executed by processing unit 122, configure processing unit 122 to implement a local context awareness module 126 and a local device configuration module 130. Memory 124 may also store a local classification parameter library 135, which is a database of classification parameters for the classification of continuous and/or transient events.

Smart device 120 may also include display unit 140, interfacing unit 150, radio frequency (RF) unit 160 and other components 170.

Figure 8:
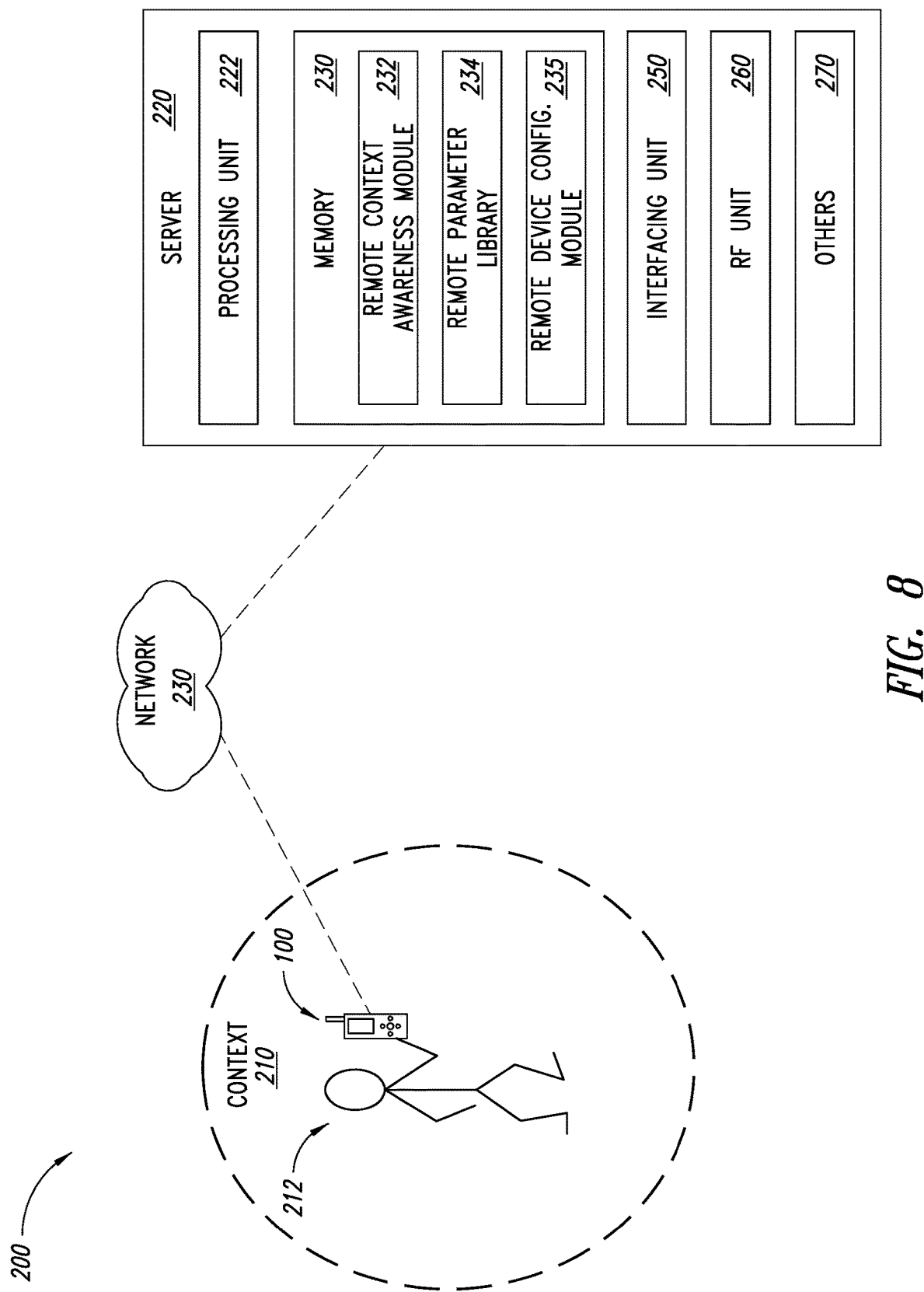
FIG. 8 illustrates an example operation environment.

FIG. 8 illustrates an operation environment 200 for context awareness analysis. In environment 200, local system 100 may be associated with a user 212 within a context 210. As appreciated, it is a sensor that actually detects information about context 210. Sensor suite 110 may need to be coupled to a first smart device 120 with limited computation capacity to enable a transmittance of the detected raw context data to a device of more computation capacity, e.g., a server or a more powerful second smart device 120. Local system 100 is used here in environment 200 for illustrative purposes and does not limit the scope of the disclosure. For example, the sensors 110 may be coupled to a smart device 120 that does not include all the components of the smart device 120 shown in FIG. 7.

Local system 100 may be communicatively coupled to a server 220 through a communication network 230. Server 220 may include a processing unit 222 and a memory 230. Memory 230 may include computer executable instructions which, when executed by processing unit 222, configure processing unit 222 to implement a remote context awareness module 232 and a remote device configuration unit 240. Memory 230 also includes a remote classification parameter library 234, which is a database stored on memory 230.

Server 220 may also include an interfacing unit 250, an RF unit 260 and other components 270.

In operation, local system 100 and server 220 and the respective components thereof may function separately or in combination to achieve context awareness. The sensors 110 of local system 100 are used to detect context data of context 210. It should be appreciated that sensors 110 may reside in or be coupled to different local smart devices 120 which may be communicatively coupled to one another directly through network 230 or indirectly through server 220. The data processing of the context data detected by sensors 110 may be locally processed by the respective associated smart devices 120 or may be centrally processed by server 220. It is also possible that the processing of detected context data may be distributed among local smart devices 120 and server 220 such that computation capacity, efficiency and timeliness in the data processing can be optimally balanced. For example, the detected context data may be pre-processed locally on smart device(s) 120 and then processed centrally on server 220. It is also possible that the detected context data is first locally pre-processed at respective local smart devices 120 and then collected by another one of the local smart devices 120, e.g., as a local processing hub, to process context awareness by itself or together with server 220. In the description here, an illustrative example of distributed processing between/among local smart devices 120 and server 220 is used. In an example, a smart device 120 may communicate to server 220 to receive from the cloud based memory 230 at least partially the classification parameter library from server 220. Such illustrative example does not limit the scope of the disclosure.

Figure 9:
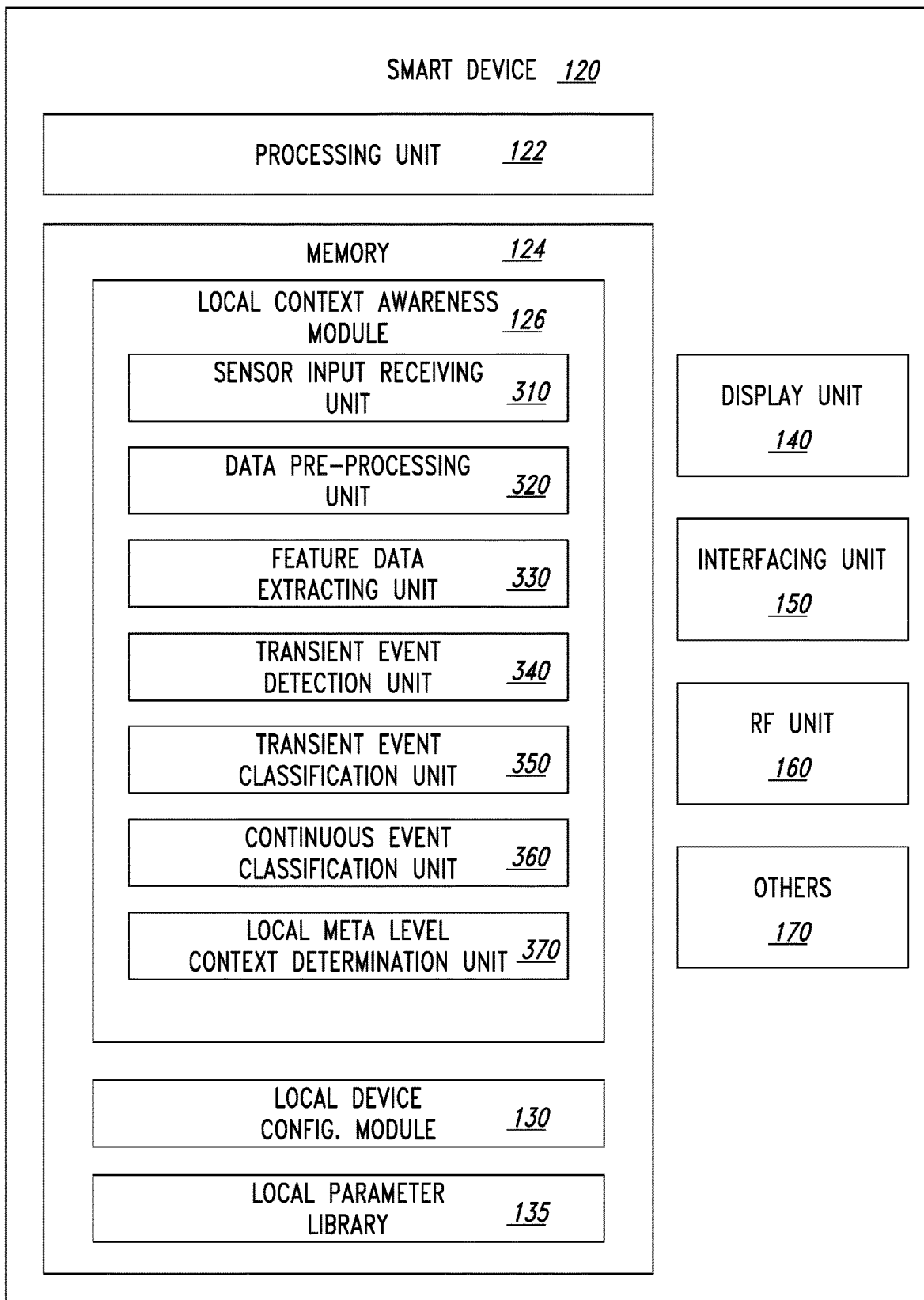
FIG. 9 illustrates details of an example smart device.

FIG. 9 illustrates an example smart device 120 showing details of local context awareness module 126. As shown in FIG. 9, local context awareness module 126 may include a sensor input receiving unit 310, a data pre-processing unit 320, a feature data extracting unit 330, a transient event detection unit 340, a transient event classification unit 350, a continuous event classification unit 360, and a local meta-level context determination unit 370.

In operation, sensor input receiving unit 310 may be configured to receive raw context data detected by sensors of sensor suite 110.

Data pre-processing unit 320 may be configured to pre-process received raw context data to facilitate further processing. In an example, the pre-processing may include filtering the raw context data to remove noise data. The noise filtering may be achieved through hardware noise cancelation circuitry or through digital data processing. Regarding hardware noise cancellation/filtering, data pre-processing unit 320 may control the setup and/or configuration of the hardware elements to fit the specific noise cancelation requirements. For example, data pre-processing unit 320 may control the raw data to be transmitted through high-pass or low-pass circuit elements depending on specific data collection requirements for context awareness analysis.

The data pro-processing may also include adding time information, e.g., applying timestamps, to the raw data detected by the sensors 110. In an example, smart devices 120 are using a same time scale in timestamping the detected raw data so that raw data received by different smart devices 120 may be easily merged and/or processing together to enhance the usability of the raw data.

Feature extracting unit 330 may be configured to generate feature data from the context data detected by sensors. The generating of the feature data may include extracting feature data in the original form from the raw context data detected by sensors 110 or may include generating feature data based on the raw context data. The feature data may correspond to the classification parameters contained in the local parameter library 135 and/or remote parameter library 234. The feature data may be specific to a type of sensor where the context data is detected, a type of context awareness scenario, e.g., motion context or sound context, or a specific application, e.g., for connected home or for autonomous piloting in smart vehicles. In an example, feature extracting unit 330 may generate different feature data for detecting a transient event, for classifying a detected transient event or for classifying a continuous event.

In an example, feature extracting unit 330 may process the received context data using a series of time windows, namely applying time windows to the context data, for the purpose of extracting feature data. The time windows may be variable depending on the type of events to be detected and/or classified, e.g., continuous event or transient event, and may be variable depending on the corresponding context domains of the context data, e.g., motion context or sound context.

In an example, feature extracting unit 330 generates feature data from the context data detected by each of the sensors 110 separately.

Transient event detecting unit 340 may be configured to detect whether a transient event happens. Transient event detecting unit 340 may detect whether a transient event happens based on the transitory nature and the short time duration of a transient event. For example, if motion data detected by an accelerometer indicates a sudden change of signal magnitude out of the range of the previous readings and the change of signal magnitude last for a short time duration, transient event detecting unit 340 may determine that a transient event in motion has happened. Transient event detecting unit 340 may use feature data obtained by feature data extracting unit 330 in detecting that a transient event happens.

Transient event classification unit 350 may be configured to determine a classification of a detected transient event. The classification may be determined based on feature data obtained from the raw context data, the classification vectors for transient events, e.g., VTV, MTV, and the classification parameters. Specifically, for example, transient event classification unit 350 may analyze, e.g., compare, the feature data with the corresponding classification parameters in the classification parameter library corresponding to the classes in the classification vectors, and determine which class in the vectors matches the detected transient event. It should be appreciated that it is not necessary that only one class in a transient classification vector matches the detected transient event. It is possible that the comparison results show that two mutually exclusive classes in a transient event classification vector, e.g., MTV, both have sufficiently high possi- bility values to match the detected transient event. Transient event classification unit 350 may output both classes for the meta-level processing to potentially remove the uncertainty thereby.

Continuous event classification unit 360 may be configured to determine a classification of a continuous event. The classification may be determined based on feature data obtained from the raw context data, the classification vectors for continuous events, e.g., VAV, MAV, and the corresponding classification parameters. Specifically, for example, continuous event classification unit 360 may compare the feature data with the corresponding classification parameters for the classes in the continuous event classification vectors and determine which class in the classification vectors matches the continuous event. It should be appreciated that it is not necessary that only one class in a classification vector matches the continuous event. It is possible that the comparison results show that two mutually exclusive classes in a continuous event classification vector, e.g., MAV, both have sufficiently high possibility values to match the continuous event. Continuous event classification unit 350 may output both classes for the meta-level processing to potentially remove the uncertainty thereby.

For each of transient event detection unit 340, transient event classification unit 350 and continuous event classification unit 360, the operation may be performed using local parameter library 130 and/or remote parameter library 234.

Local meta-level context determination unit 370 may be configured to conduct a meta-level analysis on the side of the local smart device 120 with or without coordination with server 220. The meta-level analysis analyzes the base-level classifications of continuous events and transient events, if any, based on the concurrent correlations and/or sequential correlations thereof. The meta-level analysis may lead to that some base-level classification be removed as unlikely probability results. The meta-level analysis may also lead to a sequence of classes of continuous events and/or transient events being established.

Local device configuration unit 130 may be configured to configure a smart device associated with the sensors 110 in the context 210 based on the determined base-level classifications of the continuous events and/or transient events either directly or indirectly via the meta-level analysis results, which are in turn based on the base-level classification results. The configuration may be implemented through any now-known or future developed approaches, and all are included in the disclosure.

Figure 10:
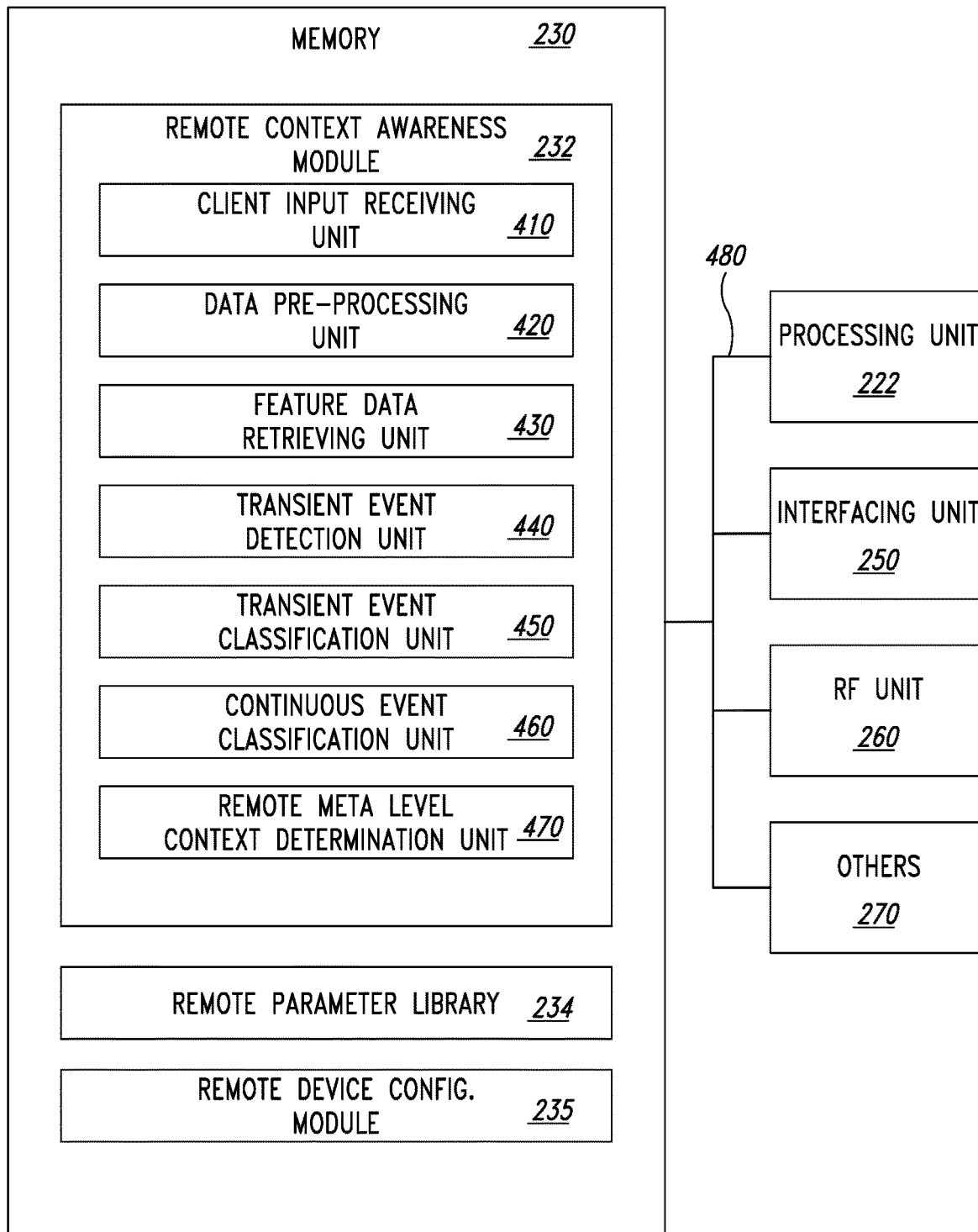
FIG. 10 illustrates details of an example server according to the present disclosure.

FIG. 10 illustrates an example server 220 showing details of remote context awareness module 232. As shown in FIG. 10, remote context awareness module 232 may include a client input receiving unit 410, a data pre-processing unit 420, a feature data extracting unit 430, a transient event detection unit 440, a transient event classification unit 450, a continuous event classification unit 460, and a remote meta-level context determination unit 470.

Server 220 may also include a remote parameter library 234, which is a database of classification parameters for the classification of continuous and/or transient events, and is stored on memory 230.

Components of server 220 may communicate with one another locally through a system bus 480 (shown for illustration) or remotely through a network. That is, elements of remote context awareness module 232 and remote device configuration unit 235 may not reside on a same physical server device and may reside on multiple physical server devices and function together through distributed computing architecture.

Client input receiving unit 410 may be configured to receive from a local smart device 120 associated with sensors 110 the context data detected by sensors 110. The context data received from local smart devices 120 may be the raw context data or may be the context data pre-processed locally at the smart device 120.

Data pre-processing unit 410 may be configured to pre-process the received context data. Data pre-processing unit 410 may pre-process context data in a manner similar to that of data pre-processing unit 310 of local smart device 120. Data pre-processing unit 410 may also pre-process context data in a manner different to that of data pre-processing unit 310 to take advantage of the higher computation capacity of processing unit 222. For example, it is possible that the context data received from local smart device 120 has been pre-processed for noise filtering and cancellation, and may be pre-processed on server 220 to add time information.

The operations of feature data extracting unit 430, transient event detection unit 440, transient event classification unit 450, continuous event classification unit 460, and remote meta-level context determination unit 470 may each be similar to that of feature data extracting unit 330, transient event detection unit 340, transient event classification unit 350, continuous event classification unit 360, and remote meta-level context determination unit 370 of local smart device 120.

It should be appreciated that any and all elements of the local context awareness module 126 and/or remote context awareness module 232 may be implemented by hardware, or software (program codes), or a combination of hardware and software. The processing units and the other functional units described herein, e.g., FIGS. 9 and 10, can be implemented by hardware, or software, or a combination of hardware and software. For example, any and all of the functions of the elements of the remote context awareness module 232 and/or local context awareness module 126 may be achieved through hardware configurations in a Field Programmable Gate Array (FPGA), other programmable logics, or other hardware implementations. One of ordinary skill in the art will also understand that multiple ones of the above described modules/units may be combined as one module/unit, and each of the above described modules/units may be further divided into a plurality of sub-modules/sub-units.

3. Example Processes

Figure 11:
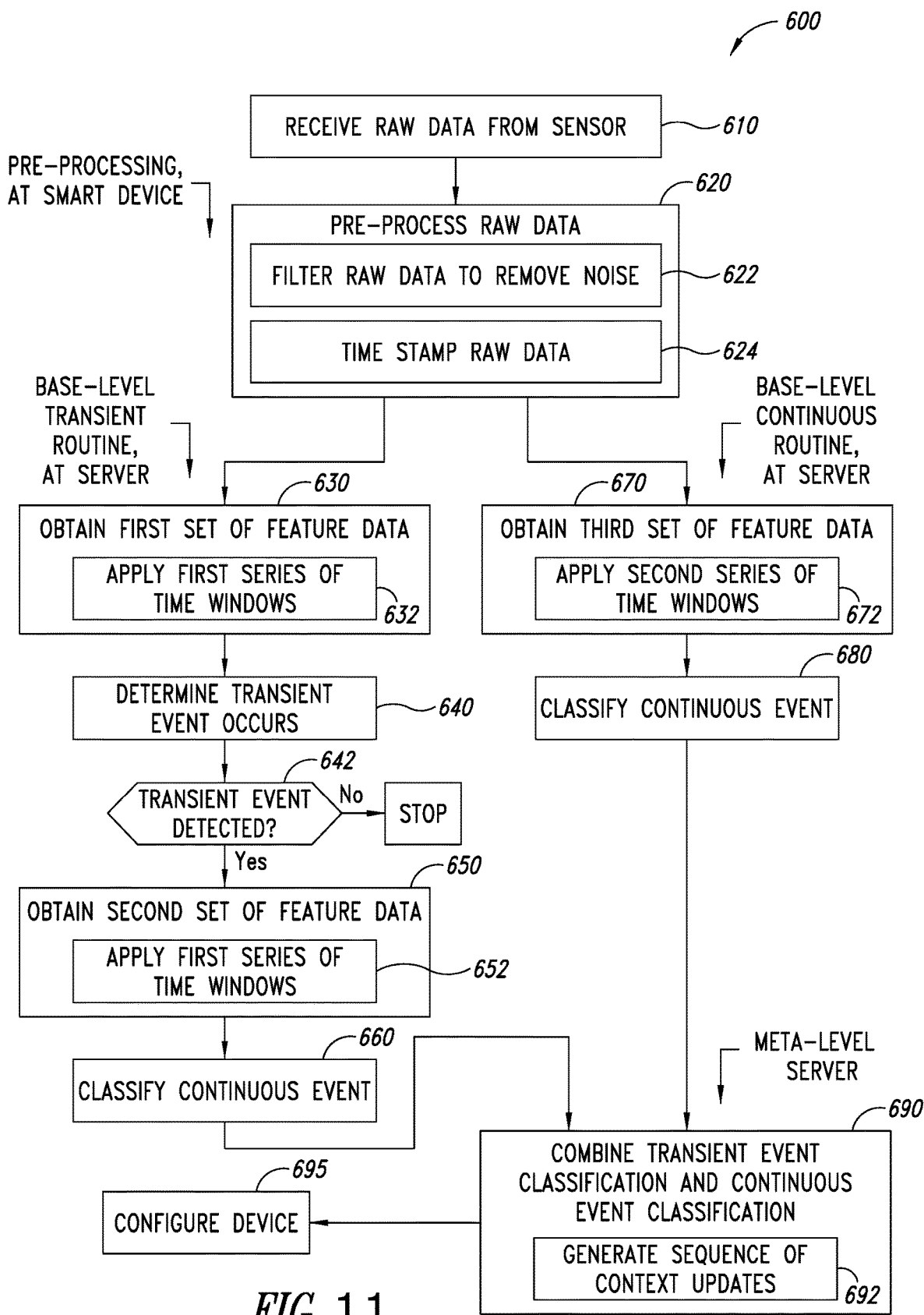
FIG. 11 illustrates an example operation process according to the present disclosure.

FIG. 11 illustrates an example operation process 600. In the description of operation process 600, examples are taken showing that the processing of context data is distributed between local smart device 120 and server 220. It should be appreciated that this example distributed processing is not necessary, and any and all of the operations of process 600 may be conducted on either one of the local smart device 120 or server 220, which are all included in the disclosure.

In example operation 610, sensor input receiving unit 310 of smart device 120 may receive raw context data from one or more sensors 110.

In example operation 620, data pre-processing unit 320 of smart device 120 may pre-process the received raw context data. Specifically, the pre-processing may include filtering the raw context data to remove noises, in sub-operation 622, and adding time information, namely timestamps, to the raw context data, in sub-operation 624. The timestamp may reflect the time point at which a piece of context data is detected by a sensor 110 and/or the time point at which smart device 120 receives the piece of context data from the sensor 110. Other approaches to add time information to the raw context data is also possible and included in the disclosure.

The pre-processed context data may be transferred from smart device 120 to server 220 for further processing.

The processing on the server side may include two levels, base-level context analysis 625 and meta-level context analysis 685.

In the base-level context analysis, there are two separate and/or parallel process routines, the base-level transient event analysis shown with operations 630 to 660, and base-level continuous event analysis shown with operations 670 to 680.

For the base-level transient event analysis, in operation 630, feature data extracting unit 430 of server 220 may obtain a first set of feature data to be used in detecting a transient event. The first set of feature data may include all the feature data required for detecting whether any transient event happens. The first set of feature data may alternatively include only the feature data for detecting whether a specified transient event happens. For example, depending on the specific scenario of context awareness analysis, feature data extracting unit 430 may also extract feature data for detecting whether a transient event in motion context happens.

Operation 630 may include a sub-operation 632, where feature data extracting unit 430 may apply a first series of time windows in extracting the first set of feature data. The first set of time windows may be selected based on the transient events to be detected. For example, for transient events in motion context, a series of time windows of less than two seconds each may be applied to the context data for extracting the first set of feature data.

For example, in motion area transient events detection, the detected accelerometer data may be decomposed using mother wavelet, and again reconstructed using the particular level of reconstruction. The Daubechies mother wavelet of order 8 may be used for decomposing and 4th level of approximation may be used for reconstruction. For generating the feature data, a sliding time window of two seconds each was applied with an overlap of 90%. The feature data calculated for detection of transient event may include short time energy, auto correlation, mean, root mean square, slope and variance of mean of the accelerometer data.

In example operation 640, transient event detection unit 440 may determine whether a transient event happens in context 210 based on the first set of feature data. In an example, the feature data may be processed with respect to the time window to which the feature data belongs. Namely, transient event detection unit 440 may determine whether a transient event happens in the time window using the feature data of the time window. Threshold criteria are included in the corresponding classification parameters to be compared with the feature data.

For example, the first set of feature data may be compared with parameters for detecting a transient event to see whether a threshold is met. For example, in sound context, the threshold may be generally related to whether the microphone signal magnitude and/or frequency is changed to a level beyond the range of the previous continuous sound event. In the sound context, the threshold may also be related to whether the change of microphone signal magnitude/frequency is within a threshold duration of time, e.g., within a single time window of the first series of time windows.

In operation 642, it is determined whether a transient event has been detected via operation 640. If it is determined that there is no transient event detected in context 210, the process of base-level transient event analysis is stopped. If it is determined that a transient event has happened in context 210, the process proceeds to example operation 650.

In example operation 650, feature data extracting unit 430 may obtain a second set of feature data from the received context data for the classification of transient events. In an example, feature data extracting unit 430 may use the same first series of time windows in extracting the second set of feature data, in sub-operation 652. But this example does not limit the scope of the disclosure, and a different series of time windows, e.g., finer than the first series of time windows, may be used in extracting the second set of feature data.

In example operation 660, transient event classification unit 450 may determine a classification of the detected transient event based on the second set of feature data. In an example, transient event classification unit 450 compares the second set of feature data with the respective classification parameters of remote parameter library 234 to determine whether the feature data match one or more of the classes in the respective classification vectors for transient events, e.g., the MTV, VTV, SETV. In an example, posteriorgram analysis is used to determine whether the feature data matches the classification parameters of the respective classes.

For example, for motion context transient event classification, the shape of data of accelerometer data may be matched with already stored templates, namely classification parameters, of Sit-to-Stand and Stand-to-Sit. As the two shapes cannot be matched directly, Dynamic Time Warping (DTW) is used. Probabilistic Support Vector Machine is used for the classification of transient motion events. The probabilistic values are obtained only for input data for which the transient event is detected.

For the base-level continuous event analysis, in example operation 670, feature data extracting unit 430 may obtain a third set of feature data from the received context data for the classification of continuous events. In an example, feature data extracting unit 430 may use a second series of time windows in extracting the third set of feature data, in sub-operation 672. The second series of time windows each is larger than that of the first series of time windows. Namely, a time window of the second series of time windows encompasses a longer time duration than that of the first series of time windows. In an example, the time window of the second series of time windows may be five seconds each.

For example, the feature data calculated on a time windowed frame of five seconds of accelerometer data includes maxima, minima, mean, root-mean-square, three cumulative features, and 10th order linear prediction coefficients. The feature data obtained from barometer data are maxima, minima, RMS, slope, and LPC co-efficient.

In example operation 680, continuous event classification unit 460 may determine a classification of the continuous event based on the third set of feature data. In an example, continuous event classification unit 460 compares the third set of feature data with the respective classification parameters of remote parameter library 234 to determine whether the feature data match one or more of the classes in the respective classification vectors for continuous events, e.g., the MAV, VAV, SEV.

In an example, posteriorgram analysis is used to determine whether the feature data matches the classification parameters of the respective classes. Specifically, for example, these feature data are applied to a generic probabilistic classifier. A probabilistic multi-class Support Vector Machine (SVM) is used as a generic classifier to provide MAP. Motion Activity Posteriorgram (MAP) could be obtained from probabilistic SVM classifier for the feature data obtained from the accelerometer data and the feature data obtained from the barometer data.

From the posteriorgrams obtained from continuous motion activity and transient motion event, a hard decision regarding classification of an element of respective continuous motion event vector MAV and transient motion event MTV could be derived. The element in a vector, MAV and/or MTV having the highest posterior probability value could be the hard decision for the provided time frame of data. It is possible that multiple classes in a vector have similar posterior probability values and each of the multiple classes may be kept for further processing in the meta-level analysis.

The base-level event classifications may be used in the meta-level context awareness analysis, in example operation 690.

Specifically, in example operation 690, remote meta-level context determination unit 470 combines the transient event classifications, if any, and the continuous event classifications to generate the meta-level context awareness result. The meta-level context awareness result may include a sequence of context updates including multiple continuous events intervened by one or transient events in a time sequence, in sub-operation 692. The combination of continuous events and/or transient events may also include removing unlikely events classifications using the sequential and concurrent analysis of the event classifications generated at the base-level analysis.

In example operation 695, local device configuration module 130 and/or remote device configuration module 235 may function individually together to autonomously configure a smart device 120 associated with sensor suite 110 based on the determined base-level transient events and/or continuous events either directly or indirectly through the meta-level context awareness analysis results, which are in turn based on the base-level transient event classification and continuous event classification. In an example, the configuring the smart device 120 associated with the one or more sensors 110 in the context includes configuring the smart device 120 to automatically conduct an action based on the determined classifications of the transient event and the determined classifications of the continuous events.

Figure 12:
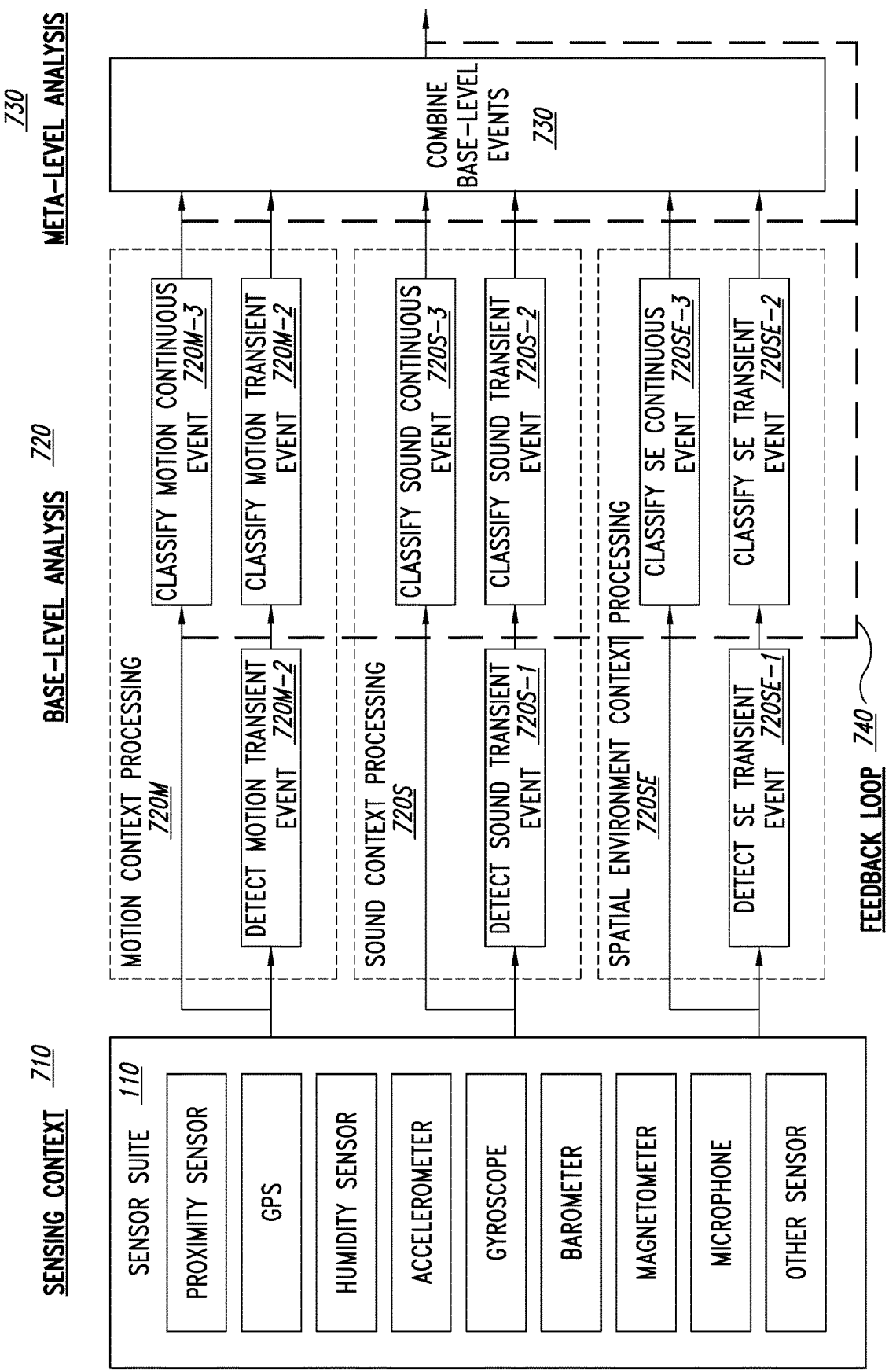
FIG. 12 illustrates another example operation process according to the present disclosure.

FIG. 12 shows another example process of context awareness analysis. As shown in FIG. 12, with the context data sensed in operation 710, the base-level context awareness analysis may be performed separately for the motion context, shown as block 720M, sound context, shown as block 720S, and spatial environment context, shown as block 720SE. Within each of blocks 720M, 720S, and/or 720SE, the classification of continuous events and the detection and classification of a transient event, if any, may be performed separately. Each and every one of the base-level analysis results, namely the classifications of the continuous events and/or transient events in the motion, sound and spatial environment contexts, are provided as inputs for the meta-level context awareness analysis in block 730, which may include the similar operations as example operation 690 of FIG. 11.

In each of the transient event detection or classification operations, 720M-1, 720M-2, 720S-1, 720S-2, 720SE-1, 720SE-2, feature data may be obtained from context data detected from multiple sensors. The context data detected by the multiple sensors are frames with same time windows of data processing.

Further, the base-level context awareness analysis results may be provided to the continuous event classification operations, 720M-3, 720S-3, 720SE-3, and the transient event classification operations, 720M-2, 720S-2, 720SE-2, through feedback loop 740 to be used in the classification operations. For example, a previous base-level continuous motion event classification in time window $T_0$ may be used in determining a later base-level continuous motion event classification in time window $2T_0$ that follows time window $T_0$. A previous base-level continuous motion event classification in time window $T_0$ may also be used in determining a base-level transient motion event classification in time point $T_1$ that follows time window $T_0$ (See FIG. 4).

Further, the result of the meta-level context awareness analysis may also be provided back to the base-level event classification operations 720M-2, 720S-2, 720SE-2, 720M-3, 720S-3, 720SE-3, through the feedback loop 740.

Figure 13:
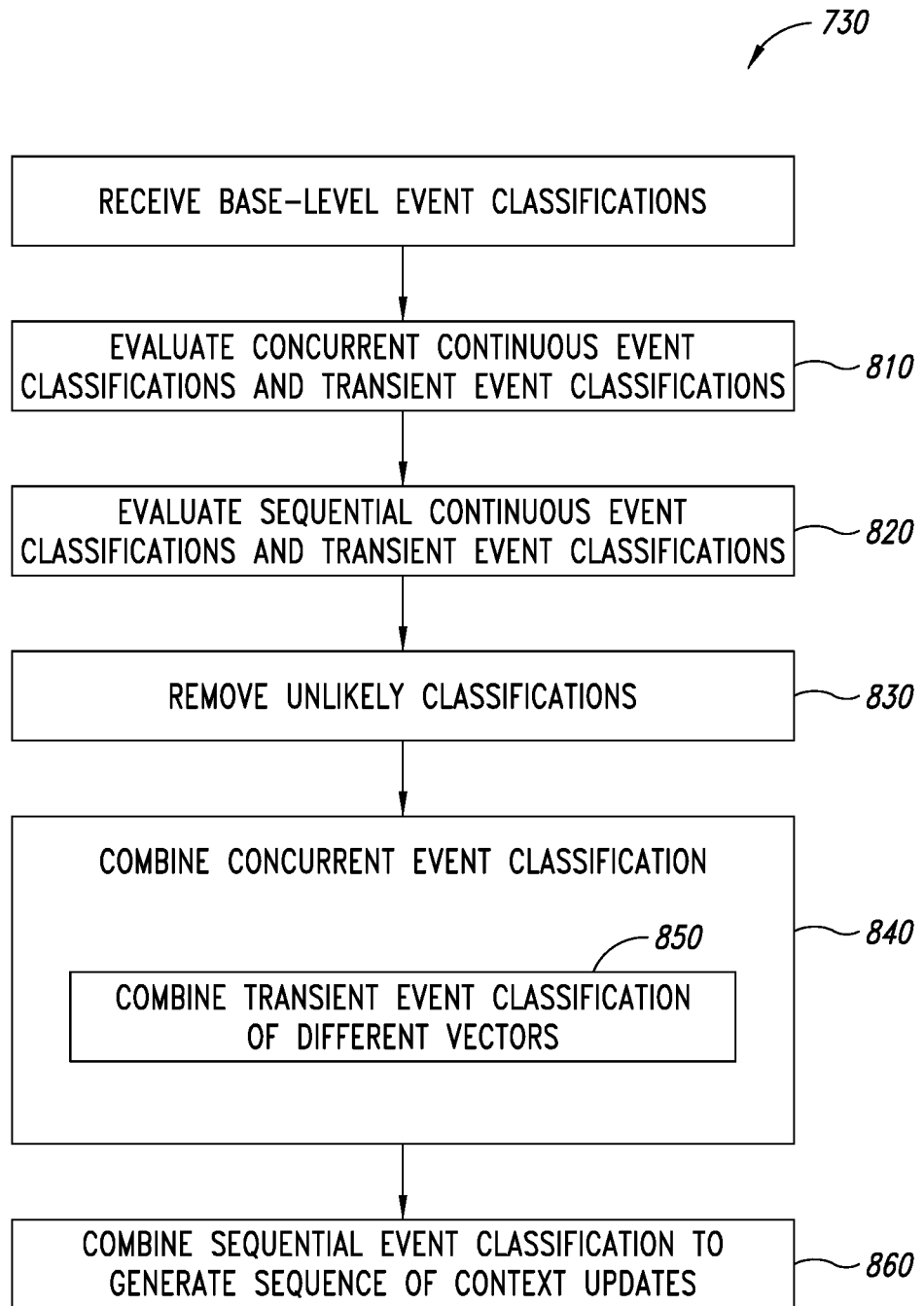
FIG. 13 illustrates another example operation process according to the present disclosure.

FIG. 13 illustrates details of example operation block 730 of FIG. 12. In example operation 810, the concurrent continuous event classifications and transient event classifications generated from the base-level analysis may be evaluated together. The concurrent evaluation may help to reinforce and/or clarify the decision makings on the base-level context awareness analysis. For example, a concurrent spatial environment continuous event of "in theater" may strengthen the finding of continuous motion event of "sitting still". A spatial environment transient event of "dropping utensil" will nullify a spatial environment continuous event of "on street".

In example operation 820, sequential continuous event classifications and/or transient event classifications may be evaluated together.

In example operation 830, unlikely event classifications may be removed.

In example operation 840, the remaining concurrent event classifications may be combined, which may include combining transient event classifications of different vectors, in sub-operation 850. For example, "phone ring" as a transient event in spatial environment context or sound context may be combined with "sit-to-stand" motion transient event. The combination results will strengthen a context awareness result that a user is standing up to reach a phone and to answer an incoming phone call. Such meta-level context awareness will more solidly help decision making in configuring, for example, a connected TV to lower and/or silence the sound volume of the speakers.

In example operation 860, the remaining event classifications may be combined to generate a sequence of context updates. The sequence of context updates may include context updates in multiple context areas, e.g., motion, sound and spatial environment, and may include continuous events intervened by transient events. For example, using sensors coupled to a smart phone of a user, a sequence of context updates may be determined as including "drive a car" (a continuous motion event) plus concurrent "on a street" (a continuous spatial environment event), "stop engine" (a transient motion event) plus a "house address" (a continuous spatial environment event), "sit-to-stand" (a transient motion event) plus the "house address", "walk" (a continuous motion event) plus the "house address", "stop walking" (a transient motion event), "stand still" (a continuous motion event) plus concurrent "doorbell ring" (a transient spatial environment). With such meta-level context awareness, which indicates that the user is visiting another house, the smart appliance at the user's home, e.g., the smart temperature control at the user's home, may be automatically configured to continue the setting of "homeowner away". In this example, the smart appliance at the user's home is associated with the sensors of another smart device, e.g., a mobile phone of the user through server 220.

Figure 14:
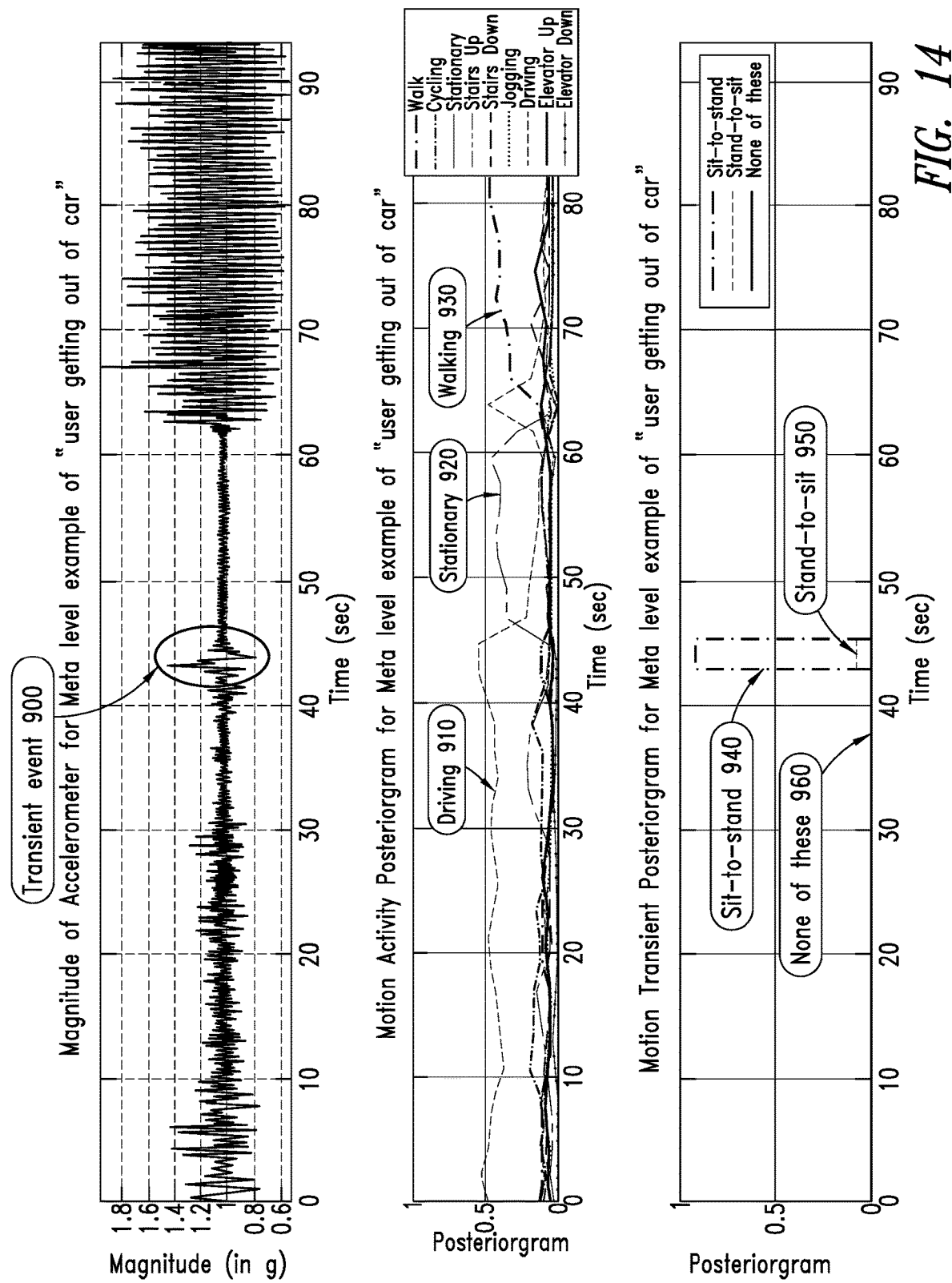
FIGS. 14 and 15 illustrate an example meta-level analysis of an example sequence of events according to the present disclosure.
Figure 15:
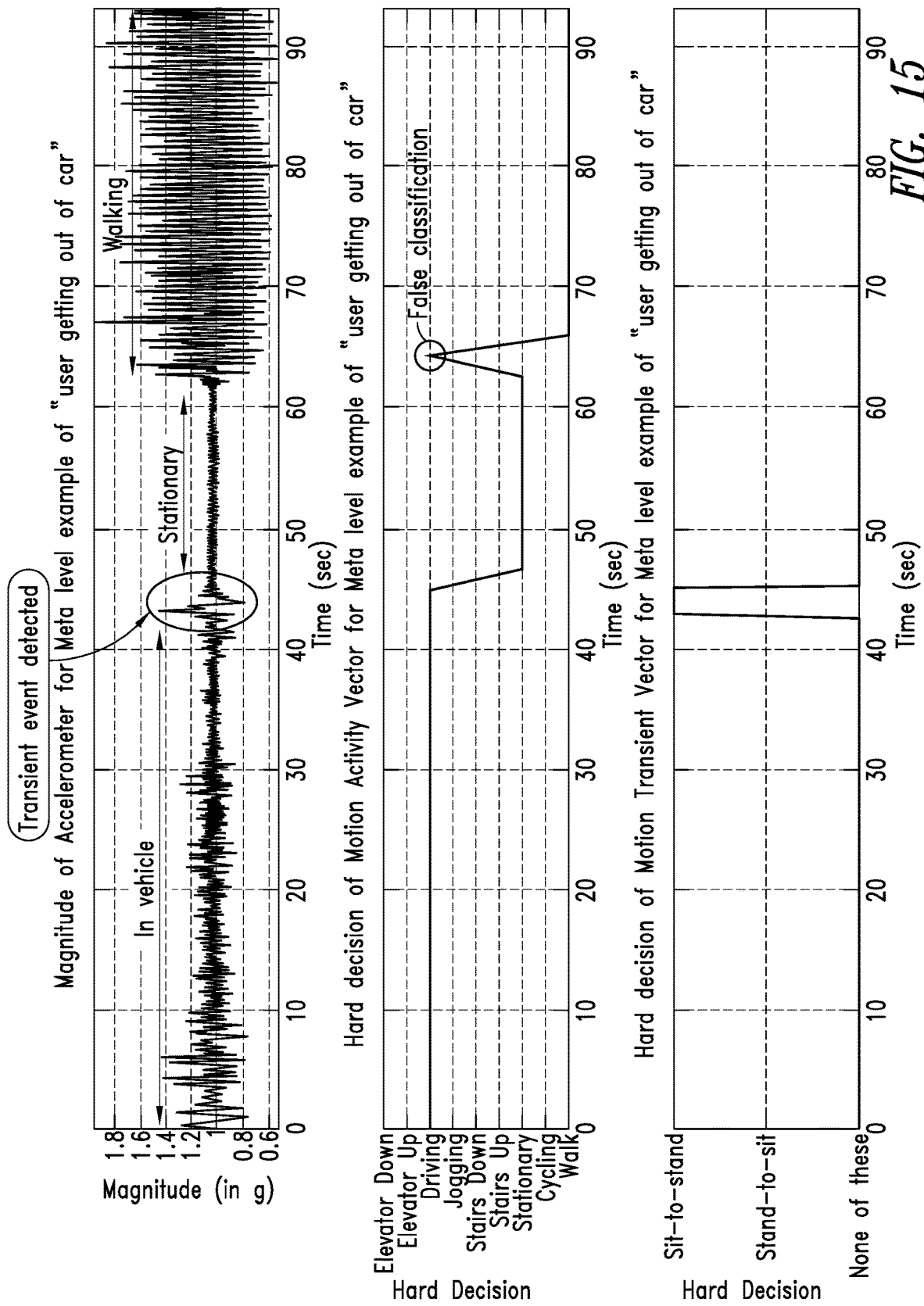

FIGS. 14 and 15 illustrate the base-level and meta-level analysis on an example "user leaving car and walking away" scenario. In FIG. 14, the upper subplot is the magnitude waveform of a tri-axial accelerometer for a context awareness application of detecting a user getting out of a car and walking away. It is detected that a transient event 900 has happened in the time points between 43 seconds and 45 seconds. The middle subplot displays the base-level Motion Activity Posteriorgram i.e., posterior probabilities for continuous events combined in a sequential basis in the meta-level analysis. As illustrated, the continuous events of "Driving" 910, followed by "Stationary" 920, and then followed "Walking" 930 have the highest posterior probability values for the respective time intervals. Between "Stationary" 920 and "Walking" 930, there is a short period of time that "Driving" 910 has a high probability value, which may be determined as a false detection in the meta-level analysis as it is not reasonable that driving a car happens in a few seconds between "Stationary" 920 and "Walking" 930. The lower subplot illustrates the Motion Transient Posteriorgram i.e., posterior probabilities, on y-axis for the detected transient event. It shows that "Sit-to-stand" transient event classification 940 has a much higher probability value than "Stand-to-sit" transient classification 950 and "None-of-these" transient classification 960.

FIG. 15 shows the example meta-level analysis results. The upper subplot magnitude waveform of tri-axial accelerometer is the same as that of FIG. 14. The middle subplot displays the analysis result of the continuous motion events as function of time derived from the Motion Activity Posteriorgram of FIG. 14, i.e., "Driving" 910, then "Stationary" 920 and then "Walking" 930. A false classification is detected and removed. The lower subplot displays the determination of "Sit-to-stand" transient event classification 940 from the Motion Transient Posteriorgram of FIG. 14. With the analysis results of FIG. 15, it is determined that a user got out of a car and walked away.

The disclosure may be further appreciated based on the following clauses:

Clause 1, a system comprising: one or more sensors configured to detect context data including at least one of motion, sound and spatial information of a context of the one or more sensors; and a storage medium containing executable instructions which, when executed by a processing unit, configures the processing unit to implement actions including: receiving the context data from the one or more sensors, obtaining a first set of feature data from the received context data, determining that a transient event happens in the context based on the first set of feature data, obtaining a second set of feature data from the received context data, determining a classification of the transient event based on the second set of feature data, obtaining a third set of feature data from the received context data, determining a classification of a continuous event in the context based on the third set of feature data, and configuring a smart device associated with the one or more sensors in the context based on the determined classification of the transient event and the determined classification of the continuous event.

Clause 2: the system of clause 1, wherein the classification of the transient event is in at least one of a motion vector, a sound vector and a spatial environment vector.

Clause 3: the system of clause 1, wherein the obtaining the sets of feature data includes processing the received context data using a series of time windows.

Clause 4: the system of clause 3, wherein: the obtaining the first set of feature data and the obtaining of the second set of feature data uses a first series of time windows; and the obtaining the third set of feature data uses a second different series of time windows.

Clause 5: the system of clause 4, wherein a time window in the first series of time windows is shorter than a time window in the second series of time windows.

Clause 6: the system of clause 1, wherein the determining the classification of the transient event based on the second set of feature data includes analyzing the second set of feature data with a library of classification parameters.

Clause 7: the system of clause 6, where in the analyzing includes a posteriorgram probability analysis of the second set of feature data with respect to the library of classification parameters.

Clause 8: the system of clause 6, wherein the library of classification parameters is customized for a user.

Clause 9: the system of clause 6, wherein the library of classification parameters is customized for a geographic location.

Clause 10: the system of clause 6, wherein the library of classification parameters is customized for a time.

Clause 11: the system of clause 6, further comprising receiving from a cloud based database at least partially the library of classification parameters.

Clause 12: the system of clause 1, wherein the obtaining the sets of feature data is conducted for context information detected by each of the one or more sensors.

Clause 13: the system of clause 12, wherein the determining that a transient event happens in the context uses feature data obtained from context information detected by a first sensor and a second sensor of the one or more sensors.

Clause 14: the system of clause 13, wherein the context information detected by the first sensor and the information detected by the second sensor are within a same time window of data processing.

Clause 15: the system of clause 1, further comprising filtering the received context data based on a characteristic of a human activity in the context.

Clause 16: the system of clause 1, wherein at least one of the determining that the transient event happens in the context and the determining the classification of the transient event considers deterministic information including at least one of a time and a geographic location of the context.

Clause 17: the system of clause 1, wherein the determining the classification of the transient event considers a continuous event prior to the transient event.

Clause 18: the system of clause 1, wherein: the classification of the transient event is determined among classification elements contained in at least one of a first motion vector, a first sound vector and a first spatial environment vector; the classification of the continuous event is determined among classification elements contained in at least one of a second motion vector, a second sound vector and a second spatial environment vector; and the first motion vector and the second motion vector are mutually exclusive to one another at a same time point of the context.

Clause 19: the system of clause 18, wherein classification elements in the first motion vector are mutually exclusive to one another at a same time point of the context.

Clause 20: the system of clause 18, wherein a classification element in the first motion vector, the first sound vector or the first spatial environment vector lasts shorter than a classification element in the second motion vector, the second sound vector or the second spatial environment vector, respectively.

Clause 21: the system of clause 1, wherein the configuring the smart device associated with the one or more sensors in the context includes configuring the smart device to automatically conduct an action based on the determined classification of the transient event and the determined classification of the continuous event.

Clause 22: the system of clause 1, further comprising adding time information to the received context data from the one or more sensors.

Clause 23: the system of clause 1, wherein at least one of the obtaining the second set of feature data from the received context data and the determining the classification of the transient event based on the second set of feature data occurs after the determining that a transient event happens in the context based on the first set of feature data.

Clause 24: the system of clause 1, further comprising: determining a sequence of context updates based on the determined classification of the transient event and the determined classification of the continuous event, and wherein the configuring the smart device is based on the sequence of the context updates.

Clause 25: the system of clause 24, wherein the determining the sequence of the context updates based on the determined classification of the transient event and the determined classification of continuous event includes evaluating the concurrent ones of the determined classification of the transient event and the determined classification of the continuous event and the sequential ones of the determined classification of the transient event and the determined classification of the continuous event.

Clause 26: the system of clause 25, wherein a rule is used in the evaluating.

Clause 27: the system of clause 24, wherein the determining the sequence of the context updates based on the determined classification of the transient event and the determined classification of continuous event includes using at least one of a finite state machine algorithm or a training model.

Clause 28: the system of clause 1, further comprising combining the classification of the continuous event and the classification of the transient event to obtain a meta-level context awareness analysis result.

Clause 29: the system of clause 28, wherein the combining the classification of the continuous event and the classification of the transient event includes removing at least one of the classification of the continuous event and the classification of the transient event.

Clause 30: the system of clause 28, wherein the combining the classification of the continuous event and the classification of the transient event includes combining a classification of a transient event in one of a motion vector, a sound vector and a spatial environment vector to a transient event in another one of the motion vector, the sound vector and the spatial environment vector.

Clause 31: a method comprising: receiving, by a first smart device and from one or more sensors, context data about a context of the one or more sensors; obtaining a first set of feature data from the received context data; determining that a transient event happens in the context based on the first set of feature data; obtaining a second set of feature data from the received context data; determining a classification of the transient event based on the second set of feature data; and configuring a smart device associated with the one or more sensors in the context based on the determined classification of the transient event.

Clause 32: the method of clause 31, wherein the determining a classification of the transient event is conducted at a server communicatively coupled to the first smart device.

Clause 33: a smart device, comprising: one or more sensors configured to detect context data of a context of the smart device; a processor; and a storage medium containing executable instructions which, when executed by the processor, configures the processor to implement actions including: receiving the context data from the one or more sensors, obtaining a first set of feature data from the received context data, determining that a transient event happens in the context based on the first set of feature data, obtaining a second set of feature data from the received context data, determining a classification of the transient event based on the second set of feature data, obtaining a third set of feature data from the received context data, determining a classification of a continuous event in the context based on the third set of feature data, and configuring the smart device based on the determined classification of the transient event and the determined classification of the continuous event.

In general, in the following clauses, the terms used should not be construed to limit the clauses to the specific embodiments disclosed in the specification and the clauses, but should be construed to include all possible embodiments along with the full scope of equivalents to which such clauses are entitled. Accordingly, the breadth and scope of a disclosed embodiment should not be limited by any of the above-described exemplary embodiments, but should be defined only in accordance with the following clauses and their equivalents.

What is claimed is:

1. A method comprising:
   receiving, from one or more sensors, context data about a context of the one or more sensors;
   generating a first set of feature data from the received context data;
   determining that a transient event happens in the context based on the first set of feature data;
   generating a second set of feature data from the received context data;
   determining a classification of the transient event based on the second set of feature data;
   generating a third set of feature data from the received context data;
   determining a classification of a continuous event in the context based on the third set of feature data;
   determining a sequence of context updates based on the classification of the transient event and the classification of the continuous event by evaluating concurrent ones of classified transient event and classified continuous event and sequential ones of classified transient event and classified continuous event; and
   configuring a smart device associated with the one or more sensors in the context based on the sequence of the context updates.

2. The method of claim 1, wherein the determining the classification of the transient event based on the second set of feature data includes analyzing the second set of feature data with a plurality of classification parameters.

3. The method of claim 1, wherein the determining the classification of the transient event is conducted at a server communicatively coupled to the smart device.

4. The method of claim 1, further comprising adding time information to the context data received from the one or more sensors.

5. The method of claim 1, further comprising combining the classification of the continuous event and the classification of the transient event to obtain a meta-level context awareness analysis result.

6. The method of claim 5, wherein the combining the classification of the continuous event and the classification of the transient event includes removing at least one of the classification of the continuous event and the classification of the transient event.

7. The method of claim 1, wherein the determining the sequence of the context updates includes using at least one of a finite state machine algorithm or a training model.

8. The method of claim 1, wherein:
   the classification of the transient event is determined among first classification elements contained in at least one of a first motion vector, a first sound vector and a first spatial environment vector;
   the classification of the continuous event is determined among second classification elements contained in at least one of a second motion vector, a second sound vector and a second spatial environment vector; and
   the first motion vector and the second motion vector are mutually exclusive to one another at a same time point of the context.

9. The method of claim 8, wherein a first classification element in the first motion vector, the first sound vector or the first spatial environment vector lasts shorter than a second classification element in the second motion vector, the second sound vector or the second spatial environment vector, respectively.

10. A smart device, comprising:
    one or more sensors configured to detect context data of a context of the smart device;
    a processor; and
    a storage medium containing executable instructions which, when executed by the processor, configures the processor to implement actions including:
       receiving the context data from the one or more sensors,
       generating a first set of feature data from the received context data,
       determining that a transient event happens in the context based on the first set of feature data,
       generating a second set of feature data from the received context data,
       determining a classification of the transient event based on the second set of feature data,
       generating a third set of feature data from the received context data,
       determining a classification of a continuous event in the context based on the third set of feature data,
       determining a sequence of context updates based on the classification of the transient event and the classification of the continuous event by evaluating concurrent ones of classified transient event and classified continuous event and sequential ones of classified transient event and classified continuous event, and
       configuring the smart device based on the sequence of the context updates.

11. The smart device of claim 10, wherein the configuring the smart device includes configuring the smart device to automatically conduct an action based on the determined classification of the transient event and the determined classification of the continuous event.

12. The smart device of claim 10, wherein the determining the classification of the transient event based on the second set of feature data includes analyzing the second set of feature data with a plurality of classification parameters.

13. The smart device of claim 10, wherein the actions include adding time information to the context data received from the one or more sensors.

14. The smart device of claim 10, wherein the actions include combining the classification of the continuous event and the classification of the transient event to obtain a meta-level context awareness analysis result.

15. The smart device of claim 14, wherein the combining the classification of the continuous event and the classification of the transient event includes removing at least one of the classification of the continuous event and the classification of the transient event.

16. A system comprising:
   one or more sensors configured to detect context data including at least one of motion, sound and spatial information of a context of the one or more sensors; and
   a non-transitory storage medium containing executable instructions which, when executed by a processing unit, configures the processing unit to implement actions including:
      receiving the context data from the one or more sensors,
      generating a first set of feature data from the received context data,
      determining that a transient event happens in the context based on the first set of feature data,
      generating a second set of feature data from the received context data,
      determining a classification of the transient event based on the second set of feature data,
      determining a sequence of context updates based on the classification of the transient event and classification of a continuous event by evaluating concurrent ones of classified transient event and classified continuous event and sequential ones of classified transient event and classified continuous event,
      configuring a smart device having a processor circuit and associated with the one or more sensors in the context based on the sequence of the context updates,
      wherein the generating the second set of feature data includes processing the received context data using a first series of time windows.

17. The system of claim 16, wherein the classification of the transient event is in at least one of a motion vector, a sound vector and a spatial environment vector.

18. The system of claim 16, wherein the generating the first set of feature data includes processing the received context data using a second series of time windows.

19. The system of claim 16, wherein the determining the classification of the transient event based on the second set of feature data includes analyzing the second set of feature data with a plurality of classification parameters.

20. The system of claim 16, wherein the generating the sets of feature data is conducted for context information detected by each of the one or more sensors.

* * * * *